(12) United States Patent
Li et al.

(10) Patent No.: US 10,370,560 B2
(45) Date of Patent: Aug. 6, 2019

(54) METHOD OF COATING A FLOOR WITH POLYURETHANE FLOOR FINISHES WITH HYBRID PERFORMANCE

(71) Applicant: Ecolab USA Inc., St. Paul, MN (US)

(72) Inventors: Minyu Li, Oakdale, MN (US); Catherine Hanson, Hastings, MN (US); Robert D. P. Hei, Baldwin, WI (US); Mark D. Levitt, Lake Elmo, MN (US); Lauren K. Carlson, St. Paul, MN (US); Nathan D. Peitersen, Richfield, MN (US); Anita Thomasser, New Brighton, MN (US)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 15/058,879

(22) Filed: Mar. 2, 2016

(65) Prior Publication Data

US 2016/0177126 A1 Jun. 23, 2016

Related U.S. Application Data

(63) Continuation of application No. 13/397,387, filed on Feb. 15, 2012, now abandoned, which is a
(Continued)

(51) Int. Cl.
| | |
|---|---|
| *C08G 18/08* | (2006.01) |
| *C09D 175/04* | (2006.01) |
| *B05D 1/28* | (2006.01) |
| *B05D 3/12* | (2006.01) |
| *C09D 175/08* | (2006.01) |

(Continued)

(52) U.S. Cl.
CPC ............. *C09D 175/04* (2013.01); *B05D 1/28* (2013.01); *B05D 3/12* (2013.01); *C08G 18/0852* (2013.01); *C08G 18/0866* (2013.01); *C08G 18/0838* (2013.01); *C08K 5/0008* (2013.01);
(Continued)

(58) Field of Classification Search
None
See application file for complete search history.

(56) References Cited

U.S. PATENT DOCUMENTS

| | | | |
|---|---|---|---|
| 5,352,733 | A | 10/1994 | Hart |
| 5,354,808 | A | 10/1994 | Onwumere et al. |

(Continued)

FOREIGN PATENT DOCUMENTS

| | | |
|---|---|---|
| JP | 59138212 | 8/1984 |
| JP | 62241902 | 10/1987 |

(Continued)

OTHER PUBLICATIONS

Lubrizol Aquaslip 680 technical data sheet. Jun. 4, 2007.*
(Continued)

*Primary Examiner* — Richard A Huhn
(74) *Attorney, Agent, or Firm* — Merchant & Gould P.C.

(57) ABSTRACT

VOC-compliant aqueous polyurethane floor coating compositions and components are provided. Embodiments include at least one organic solvent having a vapor pressure of less than 0.1 mm Hg under ambient conditions and a viscosity of less than 60 cps for at least three hours after being formed. The coating compositions exhibit application characteristics of acrylic floor coatings and durability characteristics of polyurethane floor coatings.

25 Claims, 11 Drawing Sheets

Related U.S. Application Data continuation-in-part of application No. 13/105,213, filed on May 11, 2011, now abandoned, which is a continuation of application No. 12/901,128, filed on Oct. 8, 2010, now abandoned.

(51) Int. Cl.

| | | |
|---|---|---|
| C09D 175/06 | (2006.01) | |
| C08K 5/00 | (2006.01) | |
| C08K 5/29 | (2006.01) | |

(52) U.S. Cl.
CPC .............. *C08K 5/29* (2013.01); *C09D 175/06* (2013.01); *C09D 175/08* (2013.01)

(56) References Cited

U.S. PATENT DOCUMENTS

| | | | | |
|---|---|---|---|---|
| 5,434,005 | A | 7/1995 | Sugiura et al. | |
| 5,508,340 | A * | 4/1996 | Hart | C08G 18/0823 |
| | | | | 524/591 |
| 5,637,639 | A * | 6/1997 | Duan | B01L 3/5027 |
| | | | | 524/500 |
| 6,225,398 | B1 * | 5/2001 | Boudreaux | C08G 18/6229 |
| | | | | 524/502 |
| 6,787,596 | B1 | 9/2004 | Maier et al. | |
| 7,205,356 | B2 * | 4/2007 | Gurtler | C08G 18/12 |
| | | | | 428/423.1 |
| 7,255,897 | B2 * | 8/2007 | Temme | C08G 18/0823 |
| | | | | 156/330.9 |
| 7,452,935 | B2 * | 11/2008 | Slone | C08G 18/0823 |
| | | | | 524/507 |
| 2003/0027968 | A1 | 2/2003 | Kato et al. | |
| 2003/0087981 | A1 | 5/2003 | Hamrock et al. | |
| 2005/0153141 | A1 * | 7/2005 | Li | B05D 1/36 |
| | | | | 428/423.1 |
| 2005/0154111 | A1 | 7/2005 | Levitt et al. | |
| 2006/0264568 | A1 | 11/2006 | Pajerski | |
| 2007/0031679 | A1 | 2/2007 | Ushida et al. | |
| 2008/0249207 | A1 * | 10/2008 | Whiteley | C09D 133/08 |
| | | | | 523/122 |
| 2008/0264445 | A1 | 10/2008 | Levitt et al. | |
| 2008/0281025 | A1 | 11/2008 | Nennemann et al. | |
| 2009/0041943 | A1 | 2/2009 | Ogawa et al. | |

FOREIGN PATENT DOCUMENTS

| | | |
|---|---|---|
| JP | 07034008 | 2/1995 |
| JP | 7082456 | 3/1995 |
| JP | 11279237 | 10/1999 |
| JP | 11323299 | 11/1999 |
| JP | 2000129116 | 5/2000 |
| JP | 2000129117 | 5/2000 |
| JP | 2000328034 | 11/2000 |
| JP | 2001129117 | 5/2001 |
| JP | 2003064149 | 3/2003 |
| JP | 2003128983 | 5/2003 |
| JP | 2004042655 | 2/2004 |
| JP | 2004307721 | 11/2004 |
| JP | 2005015734 | 1/2005 |
| JP | 2006182868 | 7/2006 |
| JP | 2006182869 | 7/2006 |
| WO | WO 95/23818 A1 | 9/1995 |
| WO | WO 2005/071032 A2 | 8/2005 |
| WO | WO 2006/104111 A1 | 10/2006 |

OTHER PUBLICATIONS

Hawley's Condensed Chemical Dictionary. "Adhesive Working Life." Mar. 2007.*

Melchiors, M. et al., "Recent developments in aqueous two-component polyurethane (2K-PUR) coatings." Progress in Organic Coatings 2000, 40(1-4), 99-109.*
Ravi Gupta, Mehdi Durali, Kurt Wood, A New Approach to Water-Based Fluoropolymer-Urethane Hybrid Coatings, Arkema, Inc. USA report www.x-cdtech.com/coatings2010/pdfs/15.4 Wood.pdf, Before Aug. 2, 2010.
Material Safety Data Sheet, Spartan Chemical Company Laminate Lights Enduramax, Before Jul. 2010.
Lubrizol Advanced Materials, Inc., Lubrizol Product Selection Guide for High-Performance Polymers and Additives for Paints, Coatings and Adhesives, Sep. 2009.
Lubrizol Advanced Materials, Inc., Technical Data Sheet for Lanco PP 1340 F, May 2006.
Dulux, Dulux Protective Coatings Tech Notes, Mar. 2010.
Basu, Mahua et al., "Recent Development in Water-Based Resins for Surface Coatings," Progress in Organic Coatings, vol. 16, Issue 1, May 17, 1988, pp. 19-49.
Bidoki, S.M. et al., "Environmental and Economical Acceptance of Polyvinyl Chloride (PVC) Coating Agents," Journal of Cleaner Production, vol. 18, Issue 3, Feb. 2010, pp. 219-225 {abstract only).
Chattopadhyay, D.K. et al., "Structural Engineering of Polyurethane Coatings for High Performance Applications," Progress in Polymer Science, vol. 32, Issue 3, Mar. 2007, pp. 352-418 (abstract only).
Galgoci, Ernest C. et al., "Solvent-Free Urethane-Acrylic Hybrid Polymers for Coatings," Feb. 1, 2005, JCT Coatings Tech, 2{13):28-36, Published by Federation of Societies for Coatings Technology.
Galgoci, Ernest C. et al., "Urethane-Acrylic Hybrid Polymers: Performance as 1K Coatings," 2001 Air Products and Chemicals, Inc. Presented at The Society of the Plastics Industry/Epoxy Resin Formulators Division Spring 2001 Conference, Toronto, Canada, Apr. 1-3, 2001, 15 pages.
Howarth, G.A. et al., "Water-Borne Polyurethane Dispersions and Their Use in Functional Coatings," Journal Surface Coatings International Part B: Coatings Transactions, Issue vol. 80, No. 7, Jul. 1997, pp. 324-328 (abstract only).
Manock, H.L., "New Developments in Polyurethane and PU/Acrylic Dispersions," 2000, Pigment & Resin Technology, vol. 29, Issue 3, pp. 143-151.
NIIR Board, Modern Technology of Surface Coating with Formulae & Their Ai;n; llications,Published by Asia Pacific Press Inc., 2003.
Scotchgard (TM) Ultra Durable Floor Finish, Technical Data Sheet, May 2009, 2 pages.
Scotchgard (TM) Ultra-Durable Floor Finish—Part B—3M Material Safety Data Sheet, Apr. 20, 2009, 7 pages.
Scotchgard(TM) Ultra Durable Floor Finish—Part A—3M Material Safety Data Sheet, Apr. 20, 2009, 7 pages.
Scotchgard(TM) Ultra Durable Floor Finish, 3M Material Safety Data Sheet, Apr. 2, 2009, 2 pages.
Scotchgard (TM) Ultra Durable Floor Finish Installation, Copyright 3M, 2005, 8 pages.
SF5000—Solvent Free Water Based Hydroxyl Functional Resin, Product Data Sheet, Henkel Technologies, 2 pages.
Thomas, Adrian, "Polyurethane Dispersions and Polyurethane/Acrylic Hybrid Dispersions for Coating and Printing Application," Surface Coatings Australia, Sep. 2008, pp. 16-24.
Two-Component Waterbased Polyurethane Coating System Based on QWF4744, Henkel Product Formulation Guide, last updated Nov. 2006, 2 pages.
Two-Component Waterbased Polyurethane Coating System Based on QWF4744, Henkel Product Formulation Guide, updated Jan. 2006, 2 pages.
Wicks, Douglas A. et al., "Autoxidizable Urethane Resins," Progress in Organic Coatings, vol. 54, Issue 3, Nov. 1, 2005, pp. 141-149 (abstract only).

* cited by examiner

METHOD OF COATING A FLOOR WITH POLYURETHANE FLOOR FINISHES WITH HYBRID PERFORMANCE

RELATED APPLICATION

This application is a continuation of U.S. patent application Ser. No. 13/397,387 filed Feb. 12, 2012 which is a continuation-in-part of U.S. patent application Ser. No. 13/105,213, filed May 11, 2011 entitled "POLYURETHANE FLOOR FINISHES WITH HYBRID PERFORMANCE" which is a continuation of U.S. patent application Ser. No. 12/901,128, filed Oct. 8, 2010 entitled "POLYURETHANE FLOOR FINISHES WITH HYBRID PERFORMANCE," now abandoned. Each of these applications are incorporated herein by reference in their entirety.

TECHNICAL FIELD

Embodiments of the present invention relate generally to floor finishes, and more particularly to multi-component polyurethane floor finishes.

BACKGROUND

Conventional floor finishes are periodically applied to a variety of flooring types (wood, vinyl, composite, terrazzo, stone, etc.) to improve use life and to enhance the visual appearance of the floor. For example, conventional acrylic based polymer finishes have a low viscosity and may be applied by simple mopping techniques. In contrast, "ultra-durable" floor finishes utilize highly cross-linked polymer chemistry such as multi-component polyurethane materials. These polyurethane finishes provide a high viscosity product, which can be applied in one or two coats, but also require special application skills and equipment. Additionally, the pot life of such polyurethanes is significantly shorter than acrylic polymer finishes.

It would be beneficial to provide a floor finish having the durability of polyurethane finishes and the ease of application of acrylic polymer finishes. It would also be beneficial to apply such finishes using VOC-compliant compositions. "VOC" refers to volatile organic compounds, which have been the subject of regulation by different government entities, the most prominent regulations having been established by the California Air Resource Board in its General Consumer Products Regulation.

SUMMARY

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

One embodiment of the invention provides a floor coating composition including an aqueous dispersion of at least one polyurethane material and a solvent system. The solvent system in one embodiment has no more than 1 wt % organic solvent having a vapor pressure of greater than 0.1 mm Hg at 20° C. The solvent system in another embodiment includes at least one aprotic solvent, and more particularly, at least one aprotic solvent having a vapor pressure of less than 0.1 mm Hg at 20° C. Particularly suitable solvents that may be included in the solvent system include dipropylene glycol methyl ether acetate solvent and 3-methoxybutyl acetate solvent. Embodiments of the present invention may have a viscosity of less than 60 cps for at least 3 hours after being formed.

Another embodiment is a floor finish system including a first component comprising at least one polyol or polyol derivative and a second component including at least one polyisocyanate or polyisocyanate derivative. The first and second components may be free of N-methylpyrrolidone and include no more than 1 wt % organic solvent having a vapor pressure of greater than 0.1 mm Hg at 20° C. based on the total weight of the first and second components. The floor finish system may be packaged in separate reservoirs as a two component system or together as a one component system.

A further embodiment is a method of coating a floor with the composition and/or system described above. The coating material applied to the floor may dry to the touch in less than 60 minutes, more particularly, less than 45 minutes.

DETAILED DESCRIPTION

Figure 1A:
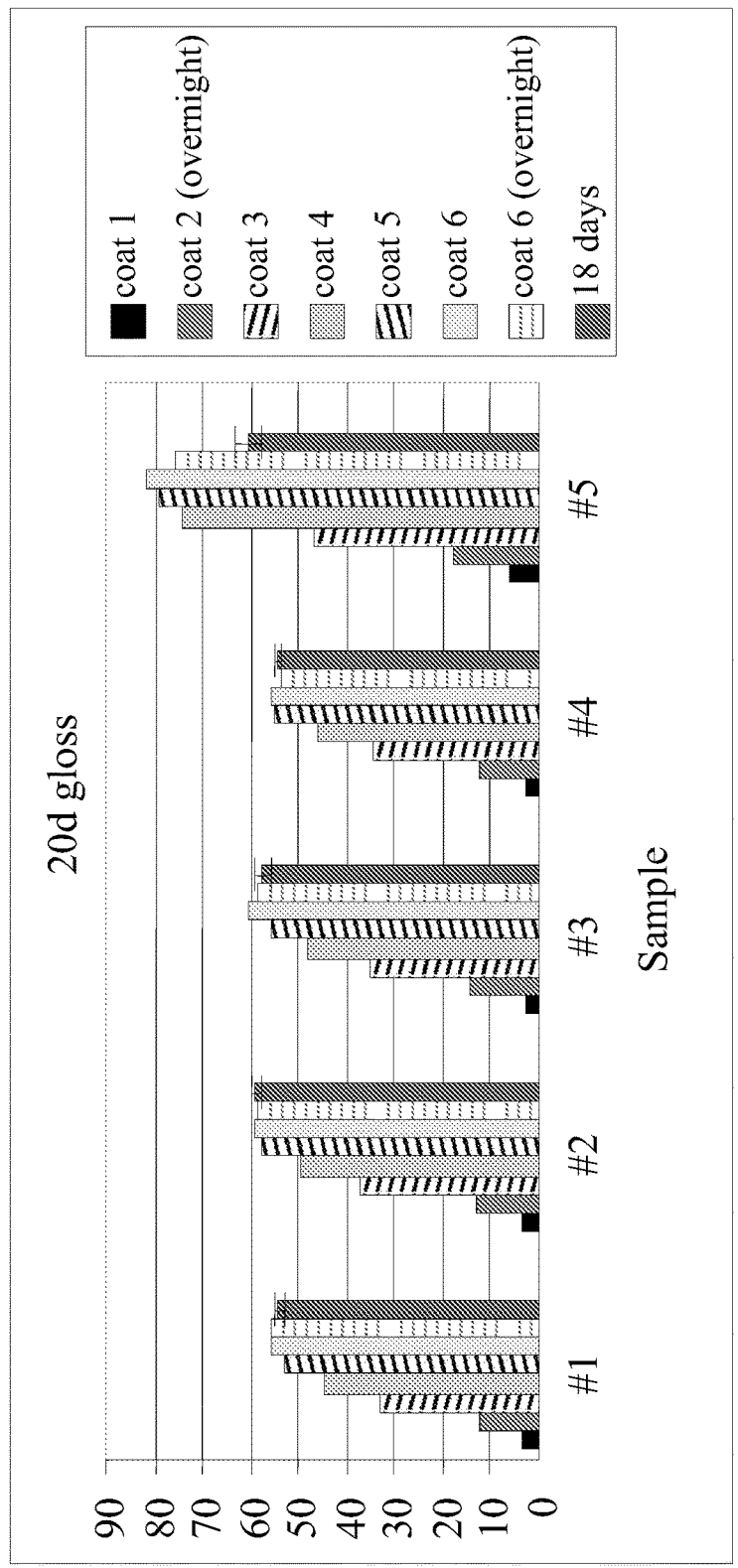
FIGS. 1A-B are bar graphs illustrating gloss properties of embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

Embodiments of the present invention provide polyurethane-based floor finish formulations. One embodiment of the present invention is a multi-component floor finish system, in which the components are combined under conditions suitable to form a low viscosity polyurethane coating material. A first component of the system is an aqueous polymer dispersion including at least one polyol material and optionally at least one wax material. A second component of the system includes a polyisocyanate material and at least one organic solvent. When combined the two components include a solvent system having no more than 1 wt % organic solvent having a vapor pressure of greater than 0.1 mm Hg at 20° C.

A variety of water dispersible polyols may be included in the first component. Suitable polyols include linear, branched or cyclic polyalkyl, polyalkene and polyalkenyl polyols, polyether polyols, fluoropolymer polyols, polyester polyols, poly(acrylate) polyols, poly(methacrylate) polyols, polysiloxane polyols, polycarbonate polyols and polyurethane polyols. The first component may constitute between about 15 wt % and 90 wt % polyol (i.e., percent solids), more particularly, between about 25 wt % and 75 wt % polyol and even more particularly, between about 30 wt % and about 60 wt % polyol.

Specific examples of commercially available polyols include QWF4744 available from Henkel, which is an aqueous solution of an OH functional polyol based resin. Another example is SF5000, which is a solvent-free water based hydroxyl functional polyol resin. Additional commercially available polyols include polytetramethylene oxide diols and polyhexamethylene diols, which are available from various sources including Sigma-Aldrich Co., Saint Louis, Mo., USA and E. I. DuPont de Nemours and Co., Wilmington, Del., USA. Examples of polysiloxane polyol materials include polydimethylsiloxane diols, available from various sources including Dow Corning Corp., Midland Mich., USA, Chisso Corp., Tokyo, Japan. Examples of suitable polycarbonate polyol materials include polyhexamethylene carbonate diols such as those available from Sigma-Aldrich Co. Examples of polyfluoroalkylene oxide diol materials include ZDOLTX, Ausimont, Bussi, Italy. Suitable polystyrene diol materials ($\alpha,\omega$-dihydroxy-terminated polystyrene) of varying molecular weight are available from Polymer Source, Inc., Montreal, Canada.

The first component may further include one or more optional chain extender residues and/or end groups. Chain extenders are typically formed from aliphatic or aromatic diols (in which case a urethane bond is formed upon reaction with an isocyanate group) or aliphatic or aromatic diamines (in which case a urea bond is formed upon reaction with an isocyanate group). Suitable chain extenders may include alpha, omega-alkane diols such as ethylene glycol (1,2-ethane diol), 1,4-butanediol, 1,6-hexanediol, alpha,omega-alkane diamines such as ethylene diamine, dibutylamine (1,4-butane diamine) and 1,6-hexanediamine, or 4,4'-methylene bis(2-chloroaniline). Other suitable chain extenders are short chain diol polymers (e.g., alpha,omega-dihydroxy-terminated polymers having a molecular weight less than or equal to 1000) including short chain polyisobutylene diols, polyether polyols such as polytetramethylene oxide diols, polysiloxane diols such as polydimethylsiloxane diols, polycarbonate diols such as polyhexamethylene carbonate diols, poly(fluorinated ether) diols, polyester diols, polyacrylate diols, polymethacrylate diols, and poly(vinyl aromatic) diols.

Optional wax materials that may be added to the first component include plant, animal and petroleum (e.g., Fischer-Tropsch) derived waxes that are present as an emulsion in the aqueous component. Suitable petroleum waxes include polyethylene waxes, polypropylene waxes and combinations thereof. Suitable polyethylene waxes may be oxidized or co-polymerized with acrylic acid to give the polyethylene chemical functionality which allows it to be emulsified in the aqueous solution. Polyethylene materials that are free of functional groups may also be used. The polyethylene may be classified as high density polyethylene (HDPE) or low density polyethylene (LDPE). HDPE is higher melting (110° C.-140° C./230° F.-284° F.) and is harder. LDPE is lower melting (100° C.-110° C./212° F.-230° F.) and softer. The wax may also be classified as non-ionic, cationic or anionic.

Particularly suitable polyethylene waxes include non-ionic HDPE waxes with non-ionic emulsifiers having a melting point between 100° C. and 150° C., more particularly, between 110° C. and 140° C., and even more particularly, between 130° C. and 140° C. The wax may also have a hardness of less than 1.0 decimillimeters of needle penetration. An example of a commercially available polyethylene wax is Poly Emulsion 325G available from ChemCor. In one embodiment, the first component includes between about 0.5 wt % and 10 wt % wax, more particularly, between about 1.0 and 5.0 wt % wax.

In some embodiments the first component may including a matting agent that resists increased gloss characteristics even after repeated burnishing and/or polishing. Suitable matting agents include waxes, alkali soluble emulsions and hydrophobically modified alkali soluble emulsions. Suitable waxes for these embodiments include Lubrizol Lanco Liquimatt 6035, Lubrizol Lanco Liquimatt 6375, Lubrizol Lanco Liquimatt 6040 each available from Lubrizol, Michelman Michem Guard 7140, Michelman Michem Guard 350, Michelman Michem Guard 25, Michelman Michem Guard 55, and Michelman Michem Guard 349 each available from Michelman. Suitable alkali soluble emulsions include Acrysol products available from DOW and Latekoll products, such as Latekoll D, available from BASF. In one embodiment, the first component includes less than about 10 wt % matting agent, more particularly, less than about 5 wt % matting agent, and even more particularly, between about 0.1 and 3.0 wt % matting agent. The gloss characteristic can be measured with a commercially available meter, such as the BYK Gardner Micro-Tri-Gloss Meter. Suitable 60° gloss readings for a coating including a matting agent are between about 10 and about 60, more suitably between about 15 and about 50, and even more suitably between about 15 and about 40.

In still further embodiments, an optional solvent may be included in the first component and may include no more than 1 wt % organic solvent having a vapor pressure of greater than 0.1 mm Hg at 20° C. to render the coating material VOC-compliant. The optional solvent included in the first component may include one or more aprotic or/and protic solvents. When combined the two components include a solvent system having no more than 1 wt % organic solvent having a vapor pressure of greater than 0.1 mm Hg at 20° C. Suitable solvents for use with the first component include glycol ethers solvents, carbonate ester solvents, ether ester solvents, more particularly, aliphatic glycol alkyl ether acetate solvents, or combinations thereof. Specific examples of suitable solvents that may be included in the first component include propylene carbonate, dipropylene glycol methyl ether acetate, 3-methoxy butyl acetate, diethylene glycol monobutyl ether, ethylene glycol monobutyl ether, dipropylene glycol n-butyl ether, dipropylene glycol n-propyl ether, ethylene glycol phenyl ether, propylene glycol phenyl ether, tripropylene glycol methyl ether, diethylene glycol monohexyl ether, 2,2,4-trimethyl-1,3-pentanediol monoisobutyrate, 1, 3/1, 4-cyclohexanedimethanol, and combinations thereof.

As noted above, the first component is in the form of an aqueous solution or dispersion. In one embodiment, the aqueous solution is also free of N-Methylpyrrolidone (NMP) solvent, whose use is subject to regulation. In another embodiment, the first component is VOC-compliant and/or VOC-free. The solution or dispersion may have a solids content of from about 5 wt % to about 50 wt %, more particularly, from about 10 to about 30 wt %, even more particularly, from about 12 to about 25 wt %. The aqueous solution or dispersion may have a solids content of less than 30 wt %, more particularly, less than about 25 wt %, even more particularly, less than about 20 wt %, and even more particularly, from about 10 wt % to about 20 wt %.

The second component of the system includes at least one polyisocyanate material and optionally an organic solvent system. Suitable polyisocyanates include a hydrophilically modified trimer of hexamethylene diisocyanate (HDT) and a hydrophilically modified trimer of isophorone diisocyanate (IPDI) and blends thereof. Additional suitable polyisocyanates may be derived from aromatic and non-aromatic (e.g., aliphatic) diisocyanates. Aromatic diisocyanates include 4,4'-methylenediphenyl diisocyanate (MDI), 2,4- and/or 2,6-toluene diisocyanate (TDI), 1,5-naphthalene diisocyanate (NDI), para-phenylene diisocyanate, 3,3'-tolidene-4,4'-diisocyanate and 3,3'-dimethyl-diphenylmethane-4,4'-diisocyanate. Non-aromatic diisocyanates include 1,6-hexamethylene diisocyanate (HDI), 4,4'-dicyclohexylmethane diisocyanate, 3-isocyanatomethyl-3,5,5-trimethylcyclohexyl isocyanate (isophorone diisocyanate or IPDI), cyclohexyl diisocyanate, 2,2,4-trimethyl-1,6-hexamethylene diisocyanate (TMDI). Blocked polyisocyanates may also be suitable. Particularly suitable commercially available polyisocyanate include Rhodocoat EZ-M502 and Rhodocoat X EZ-D 803 both available from Rhodia and Easaqua XM 502 available from Perstorp.

Suitable organic solvent systems optionally included in the second component may include no more than 1 wt % organic solvent having a vapor pressure of greater than 0.1 mm Hg at 20° C. to render the coating material VOC-compliant. In certain embodiments the solvent system may include one or more aprotic solvents, which may have a vapor pressure of less than 0.1 mm Hg at 20° C. Particular solvents include ether ester solvents, more particularly, aliphatic glycol alkyl ether acetate solvents. Specific examples of solvents that may be included in the solvent system include dipropylene glycol methyl ether acetate, 3-methoxy butyl acetate, carbonate and mixtures thereof. In some embodiments, the second component may constitute between about 5 wt % and about 50 wt % solvent system, more particularly, from about 10 wt % to about 25 wt % solvent system, even more particularly, from about 10 wt % to about 20 wt % solvent system.

The at least one polyisocyanate material and/or optional organic solvent system can affect the gloss properties of the composition. For example, the type of polyisocyanate material and/or the amount of polyisocyanate material can be chosen to provide a desired gloss. Additionally or alternatively, the type of organic solvent and/or amount of organic solvent can be chosen to provide a desired gloss. Additionally or alternatively, the selected combination of the polyisocyanate and solvent can be chosen to provide a desired gloss. Suitable polyisocyanate materials for a higher gloss product include Bayhydur XP 7165, Bayhydur 302, Rhodocoat XEZ-M 502, Rhodocoat WT 2102, and HW 100, and suitable polyisocyanate materials for a reduced gloss product include Tolonate HDT LV and Tolonate HDT LV2, and Bayhydur XP. Suitable organic solvent materials for a higher gloss product include DPMA (Dipropylene Glycol Methyl Acetate) and Butoxyl, and suitable organic solvent materials for a reduced gloss product include Dipropylene Glycol Methyl Ether and Propylene Carbonate.

The first or second component may also include various additional additives such as surfactants, defoamers, surface tension modifiers, leveling agents, air release agents, catalysts, flattening agents, plasticizers, functional polymers, hydrophilicity/hydrophobicity enhancers, particles such as colloidal particles, preservatives and coloring agents. Examples of suitable commercially available surfactants include polyether siloxane surfactants such as Tego Foamex 805 available from Tego. Suitable defoamers include SE-21 available from Wacker. Suitable colloidal particles include Bindzil CC30 available from Akzo Nobel. Suitable polymeric additives include polyurethanes, polyacrylics and polyesters. Suitable leveling agents include low molecular weight acrylic resins and urea resins. Suitable catalysts include dibutyl tin dilaurate, zinc octoate, and long chain tertiary amines.

Furthermore, the inventive polyurethane-based floor finishes can be coated on top of a sealer to improve the coating performance, such as adhesion to substrate or/and strippability. Exemplary sealer polymers include, but are not limited to, zinc free or zinc containing acrylic polymers, polyurethanes, epoxy resins, polyesters, polycarbonates and its copolymers, polystyrene and its copolymers and polyvinyl alcohol and its copolymers. Normally, 1 to 2 sealer coatings may be applied prior to applying the polyurethane finish.

The first and second components are combined prior to use to form a polyurethane coating material that may be applied to a variety of flooring materials including vinyl sheet, vinyl composite tile and terrazzo flooring. In one embodiment, the first component constitutes between about 60 wt % and about 99 wt % of the coating formulation, more particularly, from about 70 wt % to about 99 wt % of the coating formulation, even more particularly, from about 80 wt % to about 99 wt % of the coating formulation. The coating formulation may have a weight ratio of polyol to polyisocyanate of from about 50:50 to about 99:1, more particularly, from about 60:40 to about 90:10, even more particularly, from about 75:25 to about 90:10.

The polyurethane coating material may include less than about 10 wt % matting agent, more particularly, less than about 8 wt % matting agent, even more particularly, less than about 5 wt % matting agent, even more particularly, from about 0.1 wt % to about 3 wt % matting agent, and even more particularly from about 1.0 wt % to about 2.5 wt % matting agent. The polyurethane coating material may also include less than about 30 wt % organic solvent, more particularly, less than about 15 wt % organic solvent, and even more particularly, less than about 5 wt % organic solvent. As such, the coating material of embodiments of the present invention may be considered VOC-compliant and/or VOC-free.

The polyurethane coating formulation may have a pot life, drying time, and viscosity that are better than conventional polyurethane coatings and/or are similar to acrylic finishes. For example, embodiments may have a pot life of at least 3 hours, more particularly, at least 5 hours, even more particularly, at least 8 hour, even more particularly 3-10 hours, and even more particularly, 6-8 hours. As used herein, the terms pot life refers to the time period during which a coating material has suitable properties (e.g., viscosity) for the intended flooring application procedures. For example, embodiments of the present invention have a viscosity of less than about 60 cps, more particularly, less than 25 cps, even more particularly, less than 10 cps, and even more particularly, less than 7 cps during the pot life when measured with a viscometer using a LV #1 spindle at 100 rpm at about 19° C. Viscosity may also be measured in terms of gloss properties as further set forth in Example 7 below.

The polyurethane coating formulations can be applied with traditional acrylic floor finish application methods, such as string mop and flat mop applications. Embodiments may have a drying time of between 15-60 minutes/coating, more particularly 20-45 minutes/coating. Moreover, floors coated with embodiments of the present invention can be responsive to burnishing processes to restore gloss after normal wear on the coating has occurred. Suitable burnishing treatments include mechanical and chemical treatments. Compared to traditional zinc-based acrylic finishes, embodiments of the present invention have at least a 20% burnish response, more particularly, at least a 40% burnish response, even more particularly, at least a 60% burnish response, and even more particularly, at least an 80% burnish response. Additional details on burnish treatments and response are provided in Example 10 below. Alternatively, floors coated with the embodiments of the present invention can have a minimal response to burnishing so that a matte floor finish is achieved. As illustrated through the examples below, the gloss characteristic of the floor finish can be adjusted by inclusion of matting agents and the type and amount of the polyisocyanate material and the organic solvent system, and any combination thereof.

Despite having application characteristics similar to acrylic finishes, embodiments of the present invention possess durability characteristics similar to conventional polyurethane finishes. Additionally, the resulting coating finish may possess improved black mark resistance compared to conventional polyurethane coating materials. One exemplary embodiment of the multi-component system includes the following:

TABLE 1

| Component 1 | | Component 2 | | Coating Material | |
|---|---|---|---|---|---|
| | wt % | | wt % | | wt % |
| Polyol (39% solids) | 30.0-60.0 | Isocyanate | 50.0-95.0 | Comp. 1 | 75.0-99.0 |
| DI H2O | 25.0-75.0 | Solvent | 5.0-50.0 | Comp. 2 | 1.0-25.0 |
| Surfactant | 0.0-1.0 | | | | |
| Defoamer | 0.0-1.0 | | | | |
| Wax | 0.0-5.0 | | | | |
| Total | 100.00 | | | | |
| % solids | 10.0-30.0 | | | | |

EXAMPLES

TABLE 2

Material Summary

| Material | Description | Vendor |
|---|---|---|
| SF500 | NMP free version of QWF 4744 | Henkel |
| Tego Foamex 805 | Surfactant-polyether siloxane copolymer | Tego |
| SE-21 | Defoamer | Wacker |
| Poly Emulsion 325G | Polyethylene wax | ChemCor |
| DPMA | Dipropylene glycol methyl ether acetate | Multiple Sources |
| butoxyl | 3-methoxy-1-butanol acetate | Multiple Sources |
| MarketStar | Zinc containing acrylic finish | Ecolab |
| Bayhyddur XP 7165 | Polyisocyanate | Bayer |
| Bayhyddur 302 | Polyisocyanate | Bayer |
| Rhodocoat X EZ-M 502 | Polyisocyanate | Rhodia |
| Rhodocoat WT 2102 | Polyisocyanate | Rhodia |
| HW 100 | Polyisocyanate | BASF |
| Glosstek 100 | Three Component Polyurethane Coating Material | Ecolab |
| A456-II | Quaternary disinfectant | Ecolab |
| Lubrizol Lanco Liquimatt 6035 | Synthetic wax dispersion | Lubrizol |
| Lubrizol Lanco Liquimatt 6375 | Wax-treated silica dispersion | Lubrizol |
| Lubrizol Lanco Liquimatt 6040 | wax dispersion | Lubrizol |
| Lubrizol Lanco Liquimatt 6024 | wax dispersion | Lubrizol |
| Michelman Michem Guard 7140 | Anionic polyethylene wax dispersion | Michelman |
| Michelman Michem Guard 350 | Nonionic wax dispersion | Michelman |
| Michelman Michem Guard 25 | Nonionic polyethylene wax dispersion | Michelman |
| Michelman Michem Guard 55 | Nonionic polyethylene wax dispersion | Michelman |
| Michelman Michem Guard 349 | Nonionic polyethylene wax dispersion | Michelman |
| BASF ES8804 | maleic olefin co-polymer | BASF |
| Latekoll D | Hydrophobically modified alkaline soluble emulsion of acrylate | BASF |
| Tolonate HDT LV | Isocyanate | Perstorp |
| Tolonate HDT LV2 | Isocyanate | Perstorp |
| Bayhydur XP2547 | Isocyanate | Bayer |
| Brulin Natural Look | Matte Floor Finish | Brulin |
| Carefree Matte | Matte Floor Finish | Johnson Diversey |
| Spartan Matte | Matte Floor Finish | Spartan Chemical Company |

Example 1: Gloss Tests

Various samples of Component 1 and Component 2 were prepared as set forth in Tables 3 and 4 below. Component 1 in the amount of 22.1 g was placed into a glass vial and 1.23 g of Component 2 was then added. The vile was hand shaken for about 30 seconds and then allowed to stand for ten minutes. The resulting coating material was then hand coated using a microfiber pad onto a pre-scrubbed black vinyl composite tile (VCT) at ambient conditions (~68 F/40% RH). The coating weight (wet) applied to the VCT was about 2000 ft2/gal of coating material. The coated tile was allowed air dry for about 30 minutes before applying an additional coat. A total of 6 coats of the finishes were applied in 2 days to the VCT for each Sample set forth below in Table 5. The 1st and 2nd coats were applied on the 1st day, and coats 3 to 6 were applied on the 2nd day.

TABLE 3

| Materials | Component 1A wt % | Component 1B wt % | Component 1C wt % |
| --- | --- | --- | --- |
| SF5000 | 44.80 | 44.19 | 43.75 |
| DI H2O | 52.04 | 51.33 | 50.82 |
| Tego Foamex 805 | 0.11 | 0.11 | 0.11 |
| SE-21/H2O (50/50) | 0.11 | 0.11 | 0.11 |
| Poly Emulsion 325G | 2.94 | 4.27 | 5.21 |
| Total | 100.00 | 100.00 | 100.00 |
| Approximate % solids | 18.50 | 18.73 | 18.89 |

TABLE 4

| Materials | Component 2A wt % | Component 2B wt % |
| --- | --- | --- |
| EZ-M502 | 85.0 | 85.0 |
| Butoxyl | 15.0 | |
| DPMA | | 15.0 |

TABLE 5

| Samples | Component 1A | Component 1B | Component 1C | Component 2A | Component 2B | % solids |
| --- | --- | --- | --- | --- | --- | --- |
| Sample 1 | 22.1 | | | 1.23 | | 22.01 |
| Sample 2 | | 22.1 | | | 1.23 | 22.22 |
| Sample 3 | | | 22.1 | 1.23 | | 22.38 |
| Sample 4 | | 22.1 | | 1.23 | | 22.22 |
| Sample 5 | MarketStar | | | | | 25 |

Figure 1B:
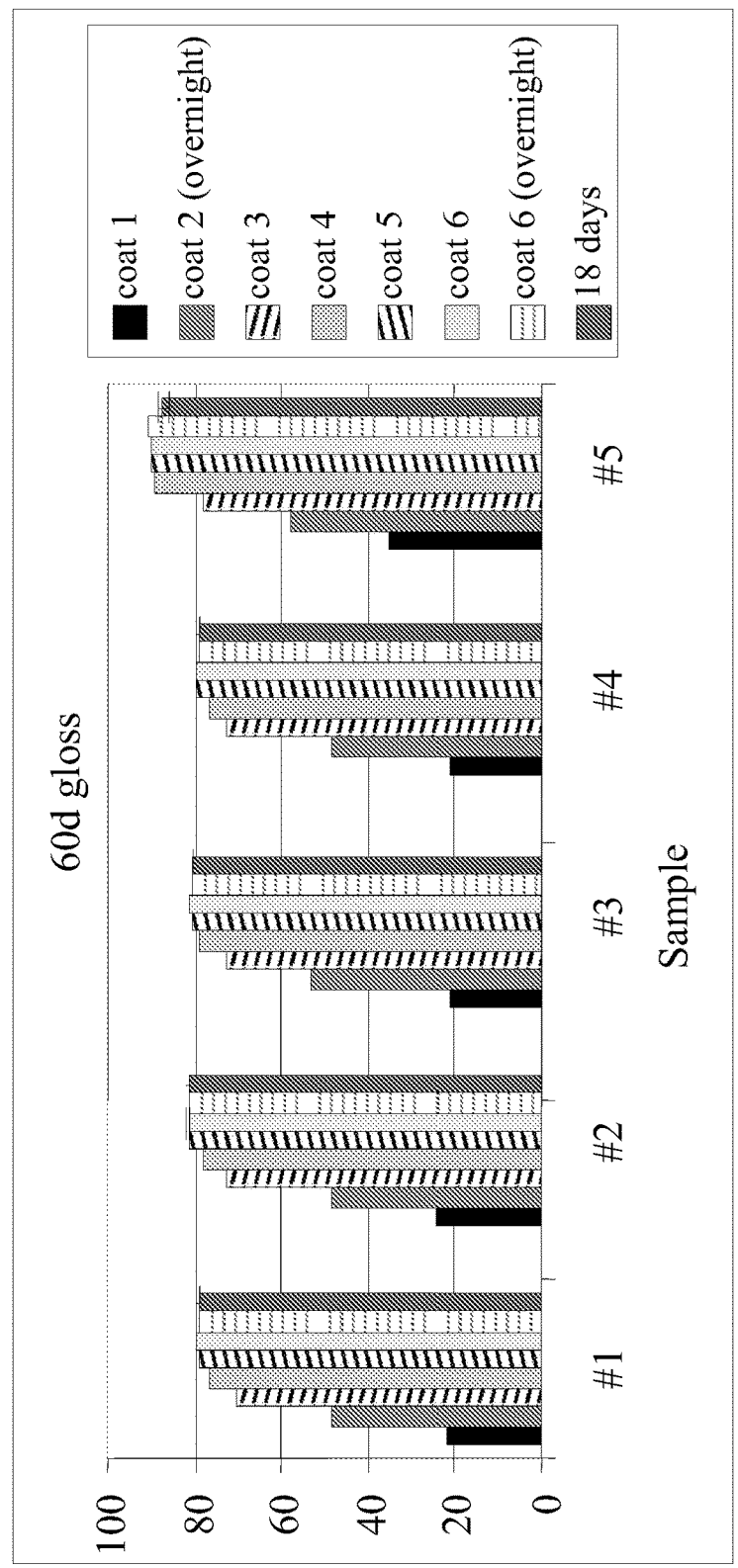

The results of these tests are shown in FIGS. 1A and 1B. The 20° gloss and 60° gloss measurements and the standard deviation were recorded using a BYK Gardner Micro-Tri-Gloss Meter. Each measurement was carried out after 30 minutes drying of the coating, except the 2nd coat and a second test of the 6 coat, both of which were measured after overnight drying. The final coat gloss was measured after overnight drying, as well as after 18 days on shelf aging.

The gloss results indicate that, although the acrylic finish of Sample 5 had higher application gloss, the formulas of Samples. 1-4 showed a lower 20° gloss reduction after drying/aging at ambient conditions. The gloss measured after about 20 days drying/aging showed that the 20° gloss of Samples. 1-4 were in the range of 54.1 to 58.9 with standard deviations of 0.9-1.5, and the acrylic finishes were about 60.5 to 63.7 with standard deviations of 2.2 to 2.8, respectively. Therefore the gloss of Samples 1-4 was close to the acrylic Sample 5 despite having a lower solids content than the acrylic finishes.

In addition, the results also showed that Samples 1-4 have a comparable drying time as the acrylic finish of Sample 5, which were in the range of less than 30 minutes at the coating environmental conditions. The experiments also demonstrated that Samples 1-4 had a sufficient pot life to allow at least four coating applications.

Example 2: Solvent

Figure 2A:
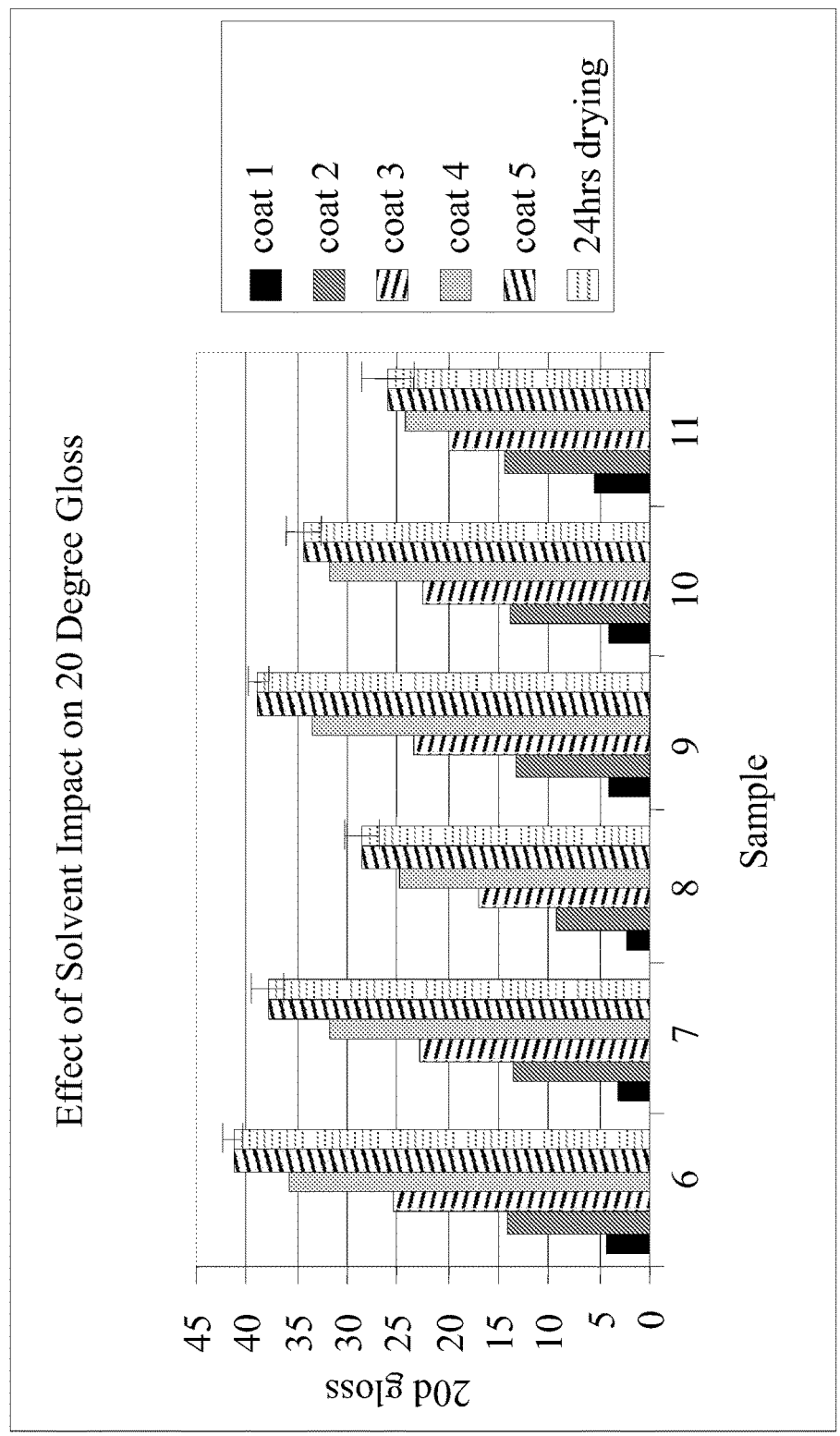
FIGS. 2A-B are bar graphs illustrating gloss properties of additional embodiments of the present invention.
Figure 2B:
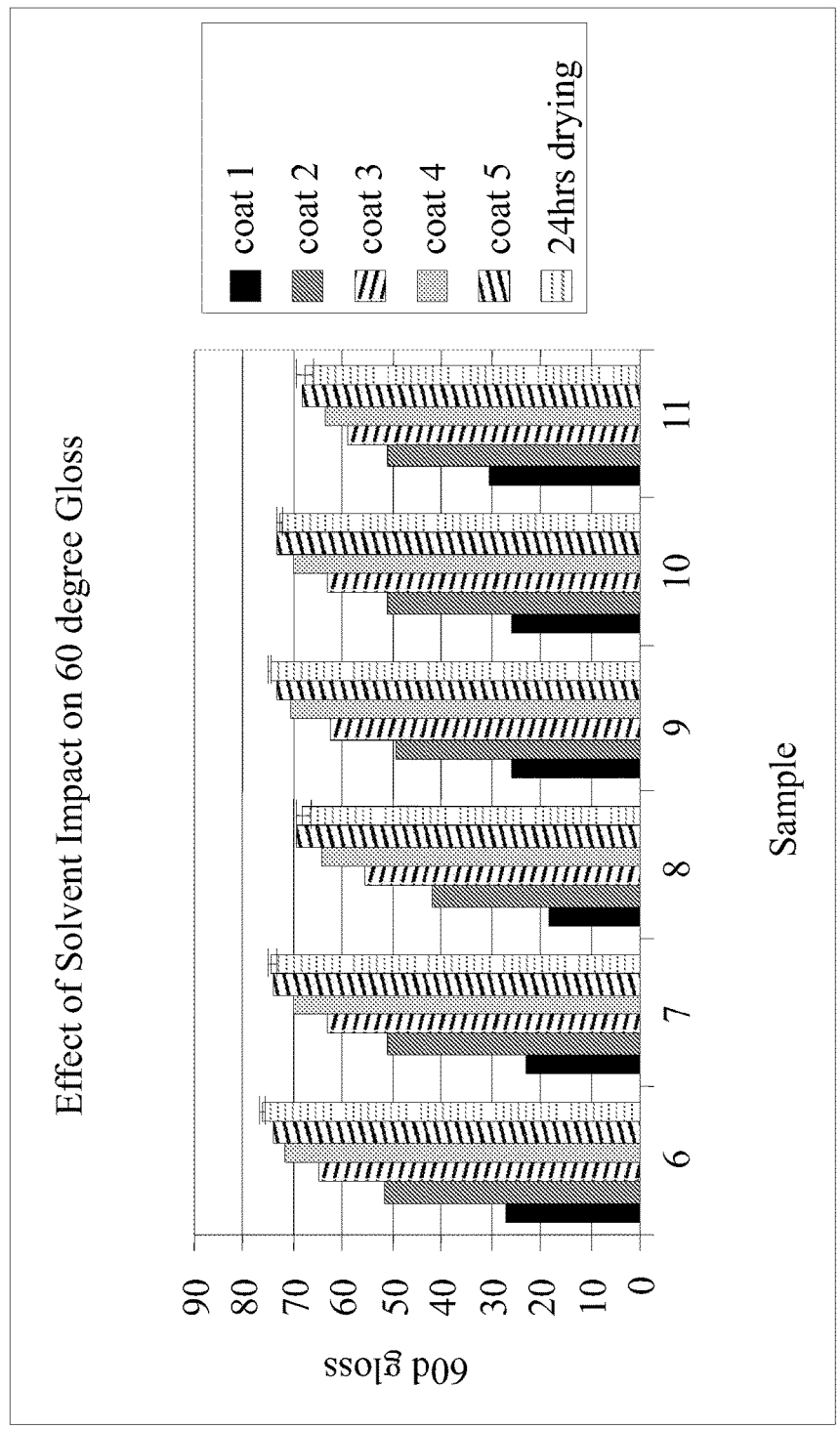

Component 1A from Example 1 was combined with Components 2A and 2B as set forth in Table 6 below. The resulting coatings were applied as described in Example 1 except that 5 coatings were applied in a single day. The gloss results are set forth in FIGS. 2A and 2B.

TABLE 6

| Samples | Comp. 1A | Comp. 2A | Comp. 2B | % solids |
| --- | --- | --- | --- | --- |
| Sample 6 | 22.1 | 1.23 | | 22.01 |
| Sample 7 | 22.1 | 1.53 | | 22.81 |
| Sample 8 | 22.1 | 1.83 | | 23.59 |
| Sample 9 | 22.1 | | 1.23 | 22.01 |
| Sample 10 | 22.1 | | 1.53 | 22.81 |
| Sample 11 | 22.1 | | 1.83 | 23.59 |

The above gloss results indicate that, unlike traditional acrylic finishes, Samples 6-11 had a minimal gloss reduction after drying overnight. In addition, the results show that, at the same loading of Component 2, both solvents (butoxyl and DPMA) showed similar impact on gloss. However, as the Component 2 concentration or the ratio of isocyanate to polyol increased, the gloss of the finish reduced.

Example 3: Surface Abrasion

Figure 3A:
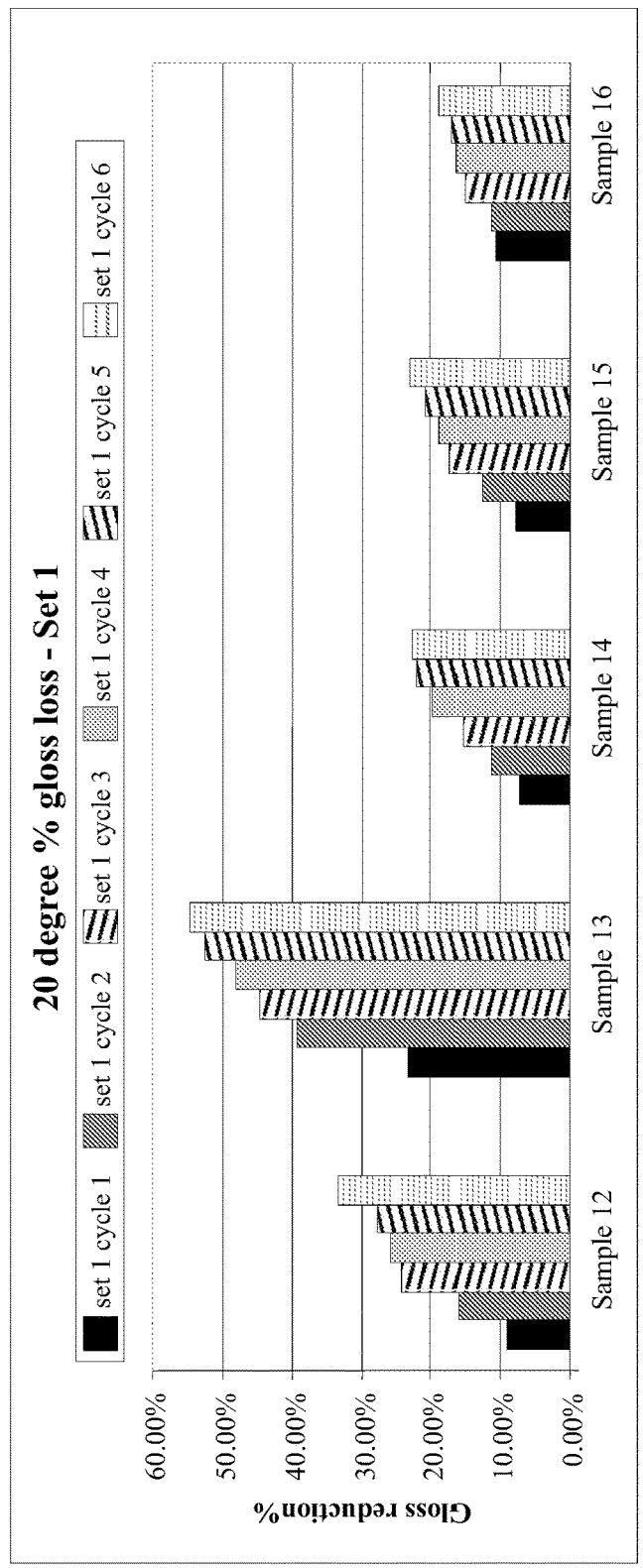
FIGS. 3A-3C are bar graphs illustrating gloss properties of additional embodiments of the present invention.
Figure 3B:
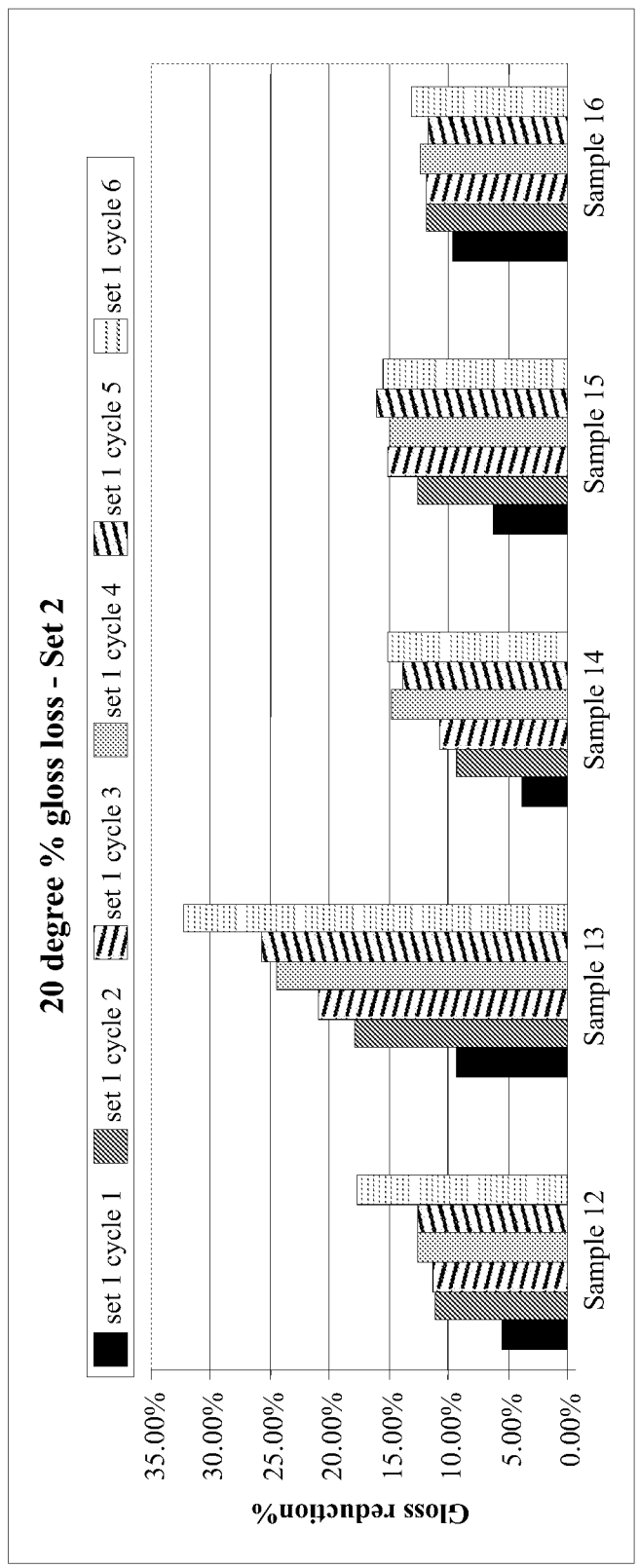
Figure 3C:
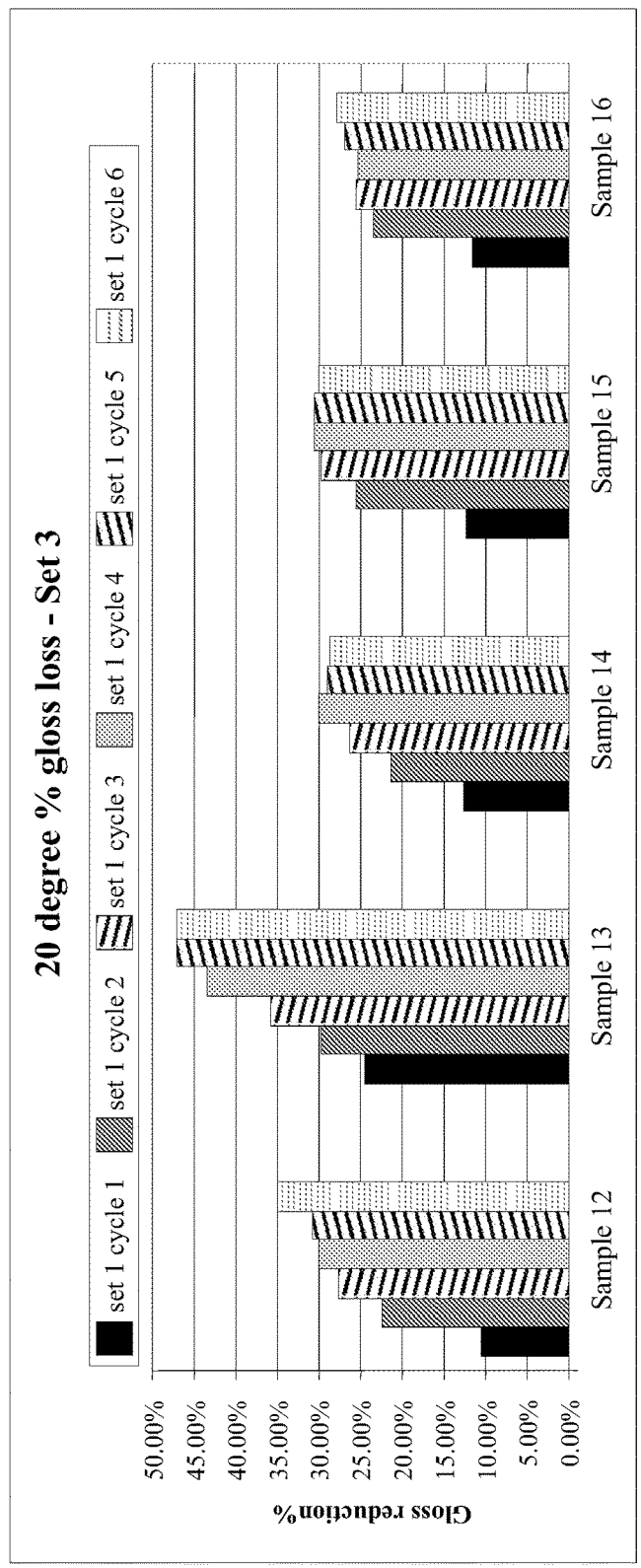

Components 1A-C were combined with Components 2A-B as set forth in Table 7. VCT substrates were then coated as set forth in Example 2 and initial gloss was measured as set forth in Table 8. Using a BYK-Gardner Abrasion Tester each Sample was then placed under a 3M Brand pink pad under 479 g weights. A total of six abrasion cycles were carried out and then gloss was re-measured. A second test was then applied to the Samples using a 3M brand pink pad under 941 g weights. A third test was then applied to the Samples using a 3M brand red pad under 941 g weights. The results of these tests are illustrated in FIGS. 3A, 3B and 3C. The gloss results over three tests were then averaged and are set forth in Table 9.

TABLE 7

| Samples | Comp. 1A | Comp. 1B | Comp. 1C | Comp. 2A | Comp. 2B | % solids |
|---|---|---|---|---|---|---|
| Sample 12 | 22.1 | | | 1.23 | | 22.01 |
| Sample 13 | MarketStar | | | | | |
| Sample 14 | | 22.1 | | 1.23 | | 22.22 |
| Sample 15 | | | 22.1 | 1.23 | | 22.38 |
| Sample 16 | | 22.1 | | | 1.23 | 22.22 |

TABLE 8

| Samples | 20° gloss | Std dev | 60° gloss | Std dev |
|---|---|---|---|---|
| Sample 12 | 54.7 | 2 | 81.5 | 1.4 |
| Sample 13 | 58.5 | 1.2 | 86.9 | 0.5 |
| Sample 14 | 53.4 | 1.9 | 79.8 | 0.8 |
| Sample 15 | 54.3 | 1.2 | 81.7 | 0.1 |
| Sample 16 | 49.9 | 0.5 | 82.5 | 0.1 |

TABLE 9

| Sample | Average 20° | Std dev | Average 60° | Std dev | % loss 20° | % loss 60° |
|---|---|---|---|---|---|---|
| Sample 12 | 22.4 | 0.7 | 56.5 | 1 | 59.05% | 30.67% |
| Sample 13 | 11.2 | 0.3 | 35.4 | 0.5 | 80.85% | 59.26% |
| Sample 14 | 27 | 0.7 | 60 | 0.6 | 49.44% | 24.81% |
| Sample 15 | 26.4 | 0.7 | 58.5 | 0.2 | 51.38% | 28.40% |
| Sample 16 | 25.9 | 0.3 | 59.8 | 0.6 | 48.10% | 27.52% |

The above results indicate that Samples 12, 14, 15 and 16 showed significantly lower gloss reduction in contrast to the acrylic finish of Sample 13. For example, after 3 sets of testing, the 20° gloss reduction of Samples 12, 14, 15 and 16 was in the range of 48-59% while the acrylic finish Sample 13, lost about 80% gloss. The experiment demonstrates that compositions of the present invention have a higher surface wear resistance than the acrylic floor finishes.

Example 4: Durability Evaluation

The components of Samples 17-20 set forth in Table 10 below were combined in a glass vial, shaken for 30 seconds, and allowed to stand for 10 minutes. The mixtures were then coated onto a Leneta sheet with a Bird Applicator having a 3 mil wet thickness, and allowed to dry for at least seven days.

Abrasion was tested with a 5130 Abraser, manufactured by TABER Industries. CS-10 wheels were used for abrasion testing. A Specimen Mounting Card was used for supporting the coated Leneta sheets during the abrasion testing. A weight loading of 2×1000 g (2 wheels, each wheel 1000 g loading) was applied. The CS-10 wheels were treated with a Taber Abraser Refacing Disc for 50 cycles under 2×1000 g loading after each sample was run. Vacuum was used during the abrasion for all of the measurements to remove surface particles generated from the abrasion. The tests were carried out at ambient conditions at about 69-70 F/24-35% RH. Coating weight loss was measured for abrasion resistance evaluation as set forth in FIG. 4. Higher weight loss indicates a lower durability of resisting the wear.

TABLE 10

| Sample | Materials | | |
|---|---|---|---|
| Sample 17 | MarketStar | | |
| Sample 18 | Comp. 1A: 22.1 g | Comp. 2A: 1.23 g | |
| Sample 19 | Comp. 1A: 22.1 g | Comp. 2B: 1.23 g | |
| Sample 20 | Comp. 1A: 22.1 g | Comp. 2B: 1.23 g | Bindzil CC30: 0.221 g |

Figure 4:
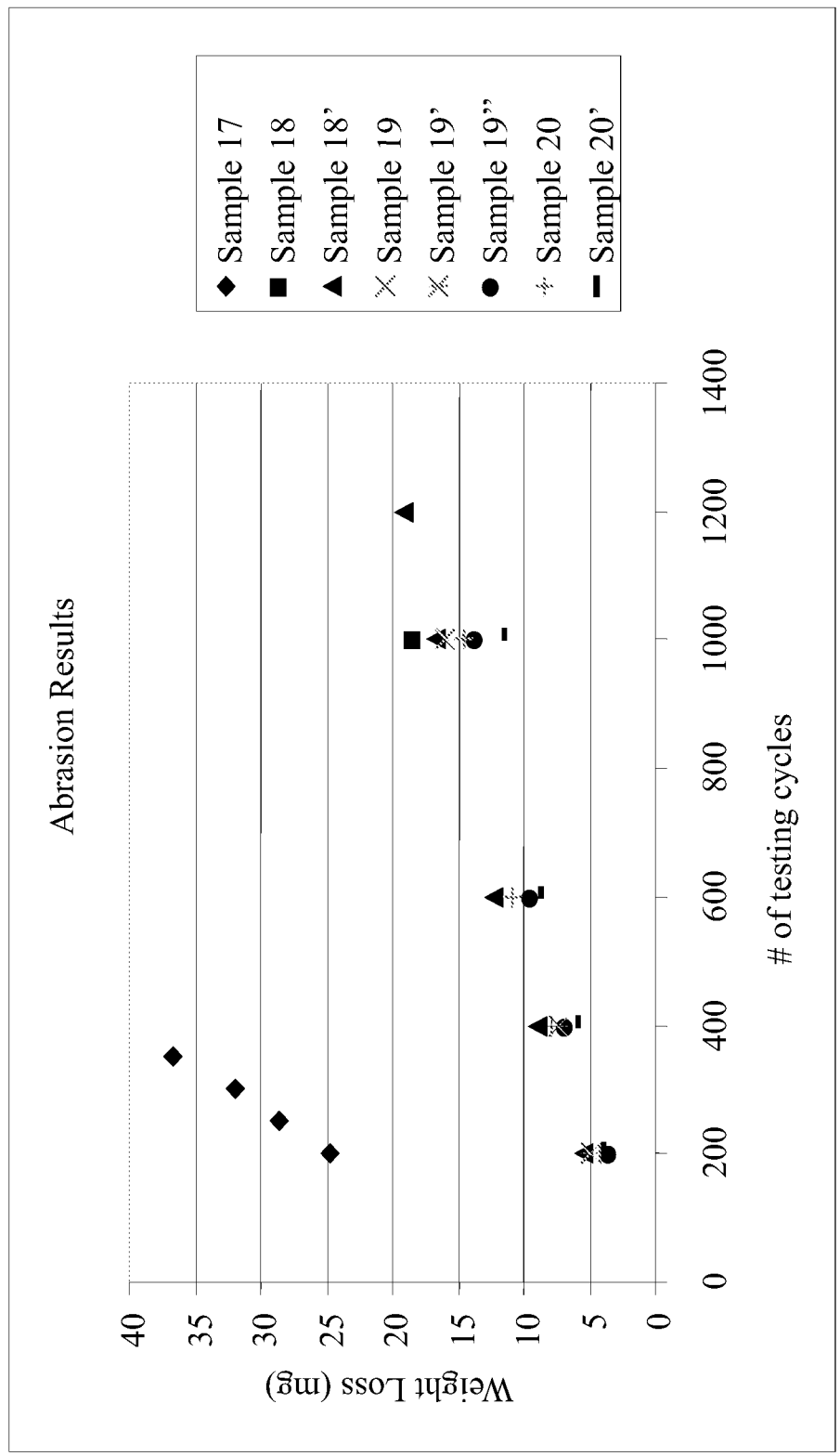
FIG. 4 illustrates abrasion resistance properties of embodiments of the present invention.

The results set forth in FIG. 4 show that Samples 18-20 had a significantly less weight loss than the acrylic finish (Sample 17) indicating these coatings are more durable than acrylic finishes.

Example 5: Mixing Evaluation

A variety of different polyisocyanate materials were combined with one or two different solvents as set forth in Table 11 below and shaken for at least two hours. Each of these materials were then combined with Component 1A as set forth in Table 12.

TABLE 11

| Comp. | Material | wt % | solvent | wt % |
|---|---|---|---|---|
| 2C | Bayhyddur XP 7165 | 85% | DPGDME | 15% |
| 2D | Bayhyddur 302 | 85% | DPGDME | 15% |
| 2E | Rhodocoat X EZ-M 502 | 85% | DPGDME | 15% |
| 2F | Rhodocoat WT 2102 | 85% | butoxyl | 15% |
| 2G | HW 100 | 85% | DPGDME | 15% |
| 2H | Bayhyddur XP 7165 | 85% | butoxyl | 15% |
| 2I | Bayhyddur 302 | 85% | butoxyl | 15% |
| 2J | Rhodocoat X EZ-M 502 | 85% | butoxyl | 15% |
| 2K | Rhodocoat WT 2102 | 85% | DPGDME | 15% |
| 2L | HW 100 | 85% | butoxyl | 15% |

TABLE 12

| | Component 1A (g) | Component 2 | Wt (g) |
|---|---|---|---|
| Sample 21 | 31.3 | 2C | 1.76 |
| Sample 22 | 31.3 | 2D | 1.76 |
| Sample 23 | 31.3 | 2E | 1.76 |
| Sample 24 | 31.3 | 2F | 1.76 |
| Sample 25 | 31.3 | 2G | 1.76 |
| Sample 26 | 31.3 | 2H | 1.76 |
| Sample 27 | 31.3 | 2I | 1.76 |
| Sample 28 | 31.3 | 2J | 1.76 |
| Sample 19 | 31.3 | 2K | 1.76 |
| Sample 30 | 31.3 | 2L | 1.76 |

Figure 5:
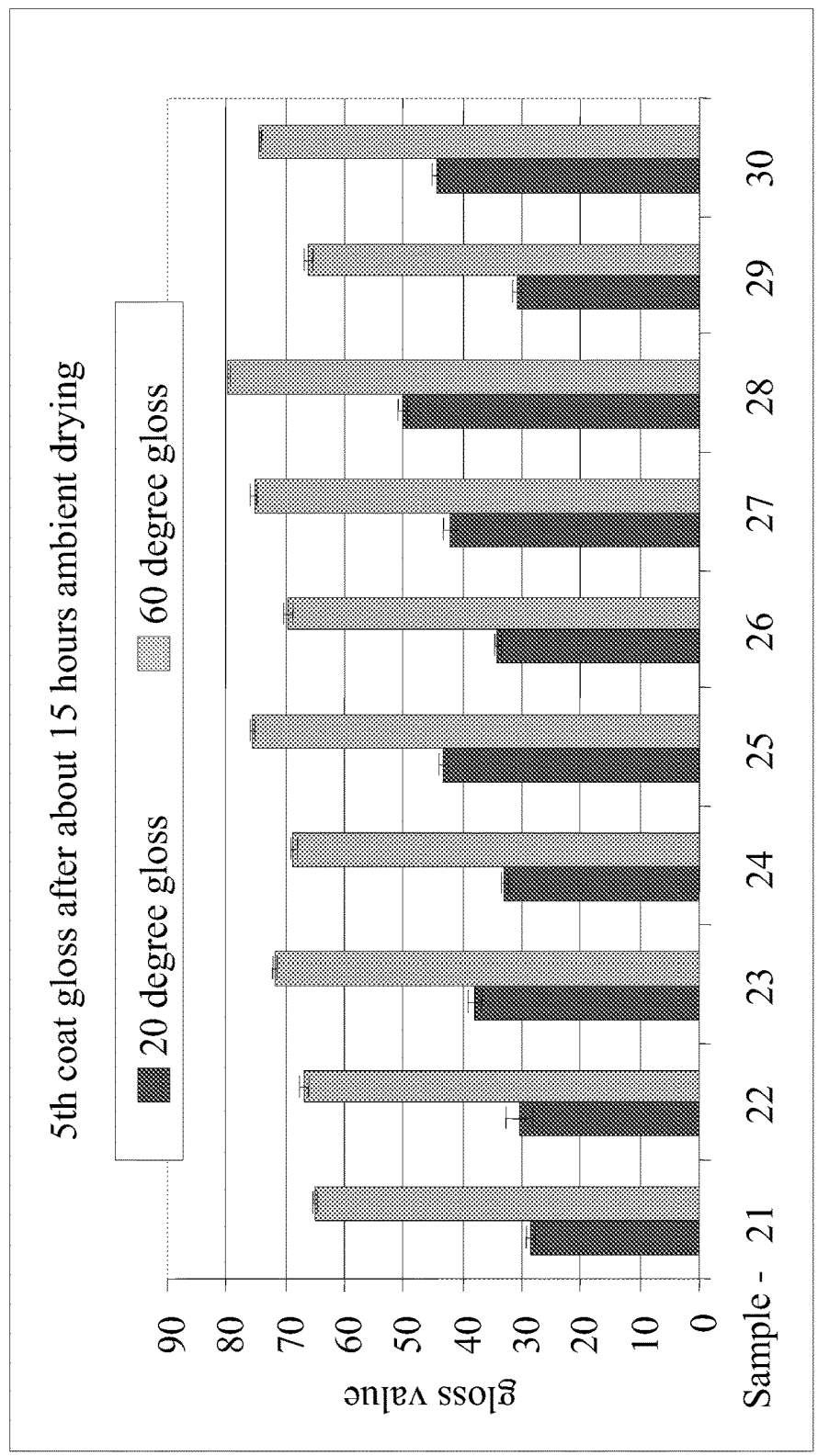
FIG. 5 is a bar graph illustrating gloss properties of additional embodiments of the present invention.

Each Sample was coated with a microfiber pad (~1.5"× 1.5") on a pre-scrubbed black VCT at ambient (~70 F/22% RH). The coating weight was controlled at about 2000 ft2/gal and air drying time was about 30 minutes for each coat, except the 1$^{st}$ coat, which was dried for about one hour. 20 and 60 degree gloss and the standard deviation of each coat were recorded with BYK Gardner Micro-Tri-Gloss Meter. The final gloss was measured on the 5$^{th}$ coat after about 15 hours drying. The results are set forth in FIG. 5.

A mixture uniformity evaluation was carried out by pouring away the liquid after completing the coating and examining the liquid residue at the bottom of the mixing container. A visual uniformity rating was then assigned as set forth in Table 13, with a higher number of uniformity indicating a better mixing.

TABLE 13

|  | Uniformity rating |  | Uniformity rating | Uniformity description | Ratings |
|---|---|---|---|---|---|
| Sample 21 | 2 | Sample 26 | 2 | significant non-uniform | 1 |
| Sample 22 | 1 | Sample 27 | 1 | non-uniform mixing | 2 |
| Sample 23 | 5 | Sample 28 | 5 | slightly non-uniform | 3 |
| Sample 24 | 3 | Sample 29 | 3 | very slightly non-uniform | 4 |
| Sample 25 | 3 | Sample 30 | 4 | uniform mixing | 5 |

The above results showed that Samples 23 and 28, can be formulated with an adequate combination of isocyanate and solvent to deliver a formulation with uniform mixing and good application gloss.

Example 6: Alcohol Resistance

Samples 32-34 set forth in Table 14 compare the alcohol resistance of commercially available floor finishes to Sample 31, an embodiment of the present invention. Glosstek 100 is a commercially available 3 component polyurethane system requiring 6-8 hours drying time per coat and a has a pot life of less than 90 minutes. MarketStar is a commercially available zinc containing acrylic floor finish. Lucent is a commercially available urethane fortified acrylic floor finish.

TABLE 14

| Condition | Sample 31 | Sample 32 | Sample 33 | Sample 34 |
|---|---|---|---|---|
| Finish | Table 15 | Glosstek 100 | MarketStar | Lucent |

TABLE 15

| Component 1A |  | Component 2B |  | Sample 31 |  |
|---|---|---|---|---|---|
|  | wt % |  | wt % |  | wt % |
| SF 5000 | 44.80 | EZ-M502 | 85.0 | 1A | 94.72% |
| DI H2O | 52.04 | DPMA | 15.0 | 2B | 5.28% |
| Tego Foamex 805 | 0.11 |  |  |  |  |
| SE-21/H2O (50/50) | 0.11 |  |  |  |  |
| 325G | 2.94 |  |  |  |  |
| Total | 100.00 |  |  |  |  |
| % solids | 18.50 |  |  |  |  |

Sample 31 was prepared by adding part 2B to part 1A in a glass vial, shaking, and allowing to settle for 20 minutes prior to use. The remaining samples were mixed as per instructions or used as is. The coatings of Samples 31, and 33-34 were applied by hand coating with a microfiber pad (~1.5"×1.5") on a pre-scrubbed black VCT at ambient conditions (72° F./43% RH). The coating weight (wet) was controlled at about 2000 ft2/gal and the coating was air died for about 30 minutes before applying the next coat. Total 5 coats of the finishes were applied in one day. For Sample 32, one layer was coated at about 400 ft$^2$/gal with a ⅜" soft woven roller on a pre-scrubbed black VCT at ambient conditions.

The coated substrates were then contacted with Endure 300, an alcohol containing hand sanitizing gel, for 95 minutes by placing a quarter-sized drop of the alcohol hand sanitizer to the coated surface. After 95 minutes the sanitizer was wiped away with a wet paper towel. The contact area was analyzed for 60 degree gloss and percent gloss loss (Original gloss—tested area gloss/original gloss) using a BYK Gardner Spectro-Guide. The results of these tests are set forth in Tables 16.

TABLE 16

| Sample | Original 60° Gloss | Tested Area 60° Gloss | Delta 60° Gloss |
|---|---|---|---|
| 31 | 71.50 | 61.90 | 9.60 |
| 32 | 88.07 | 86.50 | 1.57 |
| 33 | 82.77 | 5.90 | 76.87 |
| 34 | 85.57 | 24.07 | 61.50 |

The result indicate that Sample 31, an embodiment of the present invention had significantly lower gloss loss than samples 33 and 34, with only sample 32 (a three component system) providing slightly better performance.

The degree of whitening caused by the alcohol was measured using a BYK Gardner Spectro-Guide with Delta L being measured as Original L—Tested Area L. The results are set forth in Table 17.

TABLE 17

| Condition | Original L | Tested Area L | Delta L |
|---|---|---|---|
| 31 | 12.01 | 13.90 | −1.89 |
| 32 | 6.23 | 6.56 | −0.33 |
| 33 | 6.72 | 64.77 | −58.06 |
| 34 | 7.56 | 31.10 | −23.55 |

The results indicate that Sample 31 had a lower degree of whitening than Examples 33 and 34 and only a slightly higher degree of whitening than sample 32.

The visual appearance of the Sample tiles was also determined based on a 0 to 3 scale with 0 meaning that the alcohol did not impact the tested surface and a 3 meaning a significant impact on the tested surface. The Visual parameters set forth in Table 18 were tested, with results set forth in Table 19

TABLE 18

| Whiteness | Degree tested spot turned to white color |
|---|---|
| Residue gel | Amount of dried alcohol gel retained on the surface, and ability to wipe with wet paper towel |
| Blistering | Extent to which pin hole sized blisters are formed in the tested area |
| visible gel | Degree that tested spot is visible |
| Gloss Loss | Degree of gloss loss on the tested spot |

TABLE 19

| Sample | Residue Gel | Small Blisters | Visible Gel Mark | Gloss Loss | Film Whiteness | Total Rating |
|---|---|---|---|---|---|---|
| 31 | 0 | 0.5 | 0 | 0.5 | 0 | 1 |
| 32 | 0 | 0 | 0 | 0 | 0 | 0 |
| 33 | 2 | 0 | 3 | 3 | 3 | 11 |
| 34 | 2 | 0 | 3 | 3 | 2.5 | 10.5 |

The total rating of the appearance change after the alcohol gel test shows that Sample 31 had a lower appearance change rating than Samples 33-34, with Sample 32 providing only a slightly better appearance improvement.

Example 7: Pot Life

Samples 35-39 set forth in tables 20-23 below were for viscosity stability and coating appearance. To measure viscosity for Samples 35-38, Component 1 and 2 were mixed and the viscosity of the mixture was measured about 20 minutes later after mixing commenced using a Brookfield Model LVDV-II+ with spindle LV#1 at 100 rpm and at ambient (about 19° C.) and at various times thereafter as set forth in Table 22 below. Due to the higher viscosity of Sample 39, an LV#2 spindle at 20 rpm was used.

TABLE 20

| Material | Comp. 1A | Comp. 1D |
|---|---|---|
| SF 5000 | 44.8 | 47.74 |
| DI H2O | 52.04 | 52.04 |
| Tego Foamex 805 | 0.11 | 0.11 |
| SE-21/H2O (50/50) | 0.11 | 0.11 |
| 325G | 2.94 | 0 |
| Total | 100 | 100 |
| % solids | 18.5 | 18.5 |

TABLE 21

| Material | Comp. 2A | Comp. 2B |
|---|---|---|
| EZ-M502 | 85 | 85 |
| DPMA | | 15 |
| Butoxyl | 15 | |

TABLE 22

| Samples | Finish | Comp A1:Comp 2 |
|---|---|---|
| 35 | 1A + 2B | 94.72:5.28 |
| 36 | 1A + 2A | 94.72:5.28 |
| 37 | 1D + 2B | 94.72:5.28 |
| 38 | 1D + 2A | 94.72:5.28 |
| 39 | GlossTek 100 | |

TABLE 23

| | Viscosity (cP) | | | | |
|---|---|---|---|---|---|
| Time after | LV Spindle #1 at 100 rpm | | | | LV #2 @ 20 rpm |
| mixing | 35 | 36 | 37 | 38 | 39 |
| 0:20:00 | 6.18 | 6.96 | 6.6 | 6.54 | 1125 |
| 1:20:00 | 6.66 | 6.42 | 6.54 | 6.54 | Solidification |
| 2:20:00 | 6.42 | 6.42 | 6.24 | 6.54 | |
| 3:20:00 | 6.42 | 6.6 | 6.6 | 6.6 | |
| 4:20:00 | 6.6 | 6.66 | 6.78 | 6.84 | |
| 5:20:00 | 6.6 | 6.6 | 6.6 | 6.54 | |
| 6:20:00 | 6.6 | 6.72 | 6.3 | 6.3 | |
| 7:20:00 | 5.88 | 6.3 | 6.3 | 6.54 | |
| 8:20:00 | 6 | 6.36 | 6.36 | 6.3 | |
| 8:50:00 | 6.72 | 6.84 | 6.3 | 6.06 | |

Figure 6:
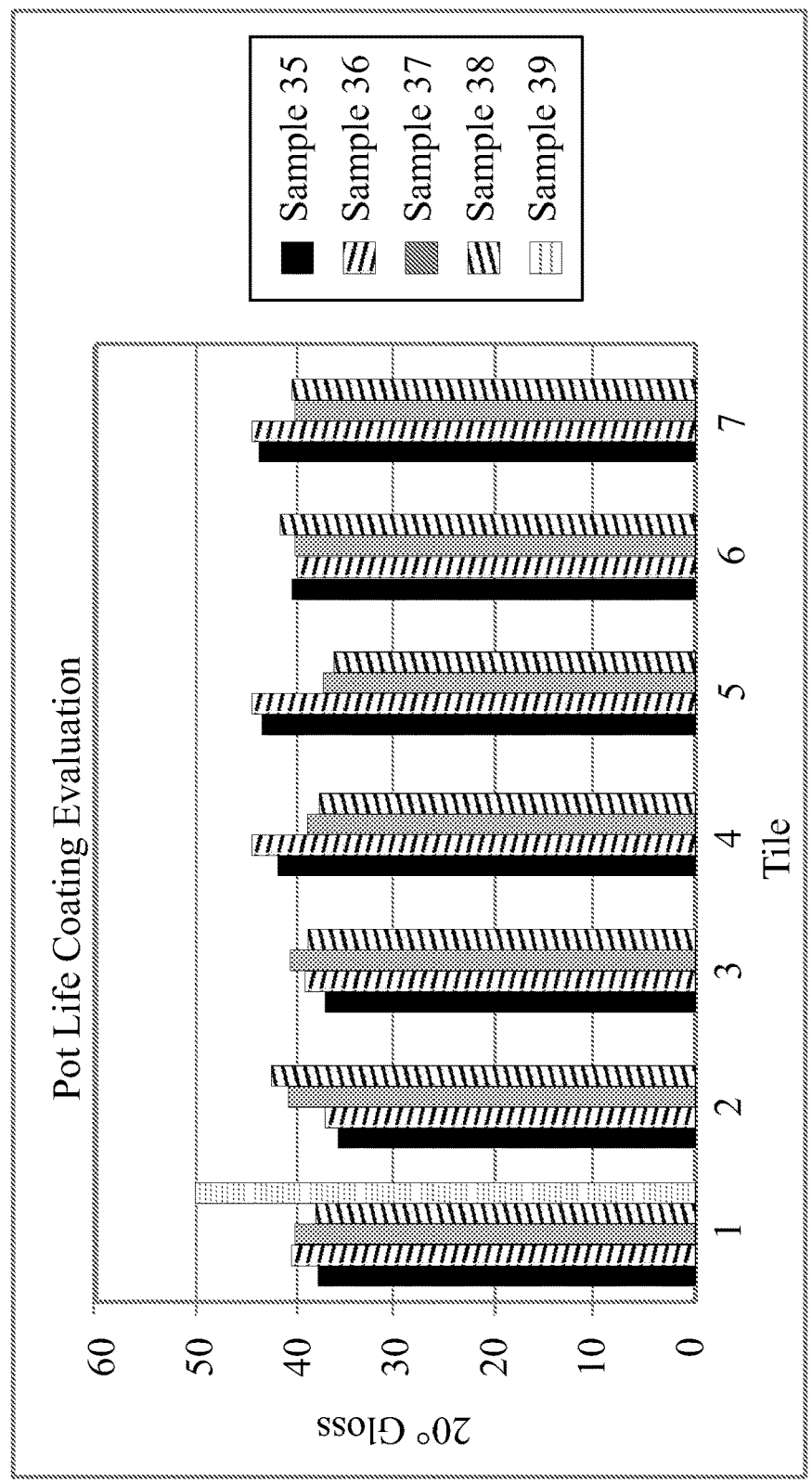
FIG. 6 is a bar graph illustrating gloss properties of additional embodiments of the present invention.

For Samples 35-38 coating appearance was measured by coating the mixture onto a black VCT substrate at a rate of about 2000 ft$^2$/gal with a microfiber pad. Five coats were applied on one VCT tile and 30 minutes drying time was allowed for each coat to dry. Gloss was measured for each coat after drying. For Sample 39, one coating was applied at a rate of 400 ft$^2$/gal with a ⅜" soft roller. These steps were repeated on a new tile every hour until 7 tiles were completed and tested for gloss. The results are set summarized in FIG. 6.

The example shows that embodiments of the present invention have a pot life, at ambient, greater than 8 hours measured by coating gloss and greater than 8.5 hours measured by viscosity. The 8 hour gloss pot life conclusion was reached because the last coat was applied at 8 hours and 20 minutes after the coating solution was mixed with a desirable dry coat result.

Example 8: Black Mark/Scuff Resistance Evaluation

Coating solutions 40-46 set forth in Tables 24-26 were prepared by adding Component 2 to Component 1, mixing for about one minute and allowing the mix to stand for at least 10 minutes before coating. The finished coating solutions were applied with a microfiber pad on a pre-cleaned white VCT tile at about 2000 ft$^2$/gal with 30 minutes drying time for each coat. A total of 5 coats were applied at ambient conditions.

Black mark resistance testing was performed using a scuff-ladder apparatus with black rubber footing after the coatings were aged for about 5 months. The testing was carried out under ambient conditions. Both L and Wb values set forth in Table 27 were recorded with a Gardner SpectroGuide before and after scuffing. The average value was calculated based on 4 scuff mark measurements. A higher L value or higher Wb value after scuffing indicates a better scuff resistance.

Two of the scuff marks were further hand wiped with a dry paper towel 3 times with low pressure. The L and Wb values were measured after wiping. A higher value change after the wiping indicates a better black mark/scuff removal.

TABLE 24

| Comp. 1 Materials | Component 1E wt % | Component 1F wt % | Component 1G wt % |
|---|---|---|---|
| SF-5000 | 46.15 | 44.80 | 44.80 |
| DI H2O | 53.63 | 52.04 | 52.04 |
| Tego Foamex 805 | 0.11 | 0.11 | 0.11 |
| SE-21/H2O (50/50) | 0.11 | 0.11 | 0.11 |
| Poly Emulsion 325G | | 2.94 | 2.94 |
| Conrez 510 | | | 2.00 |
| Total | 100.00 | 100.00 | 102.00 |

TABLE 25

| Comp. 2 Materials | Component 2M wt % | Component 2N wt % |
|---|---|---|
| Rhodocoat X EZ-M 502 | 50 | 85 |
| Rhodocoat X EZ-D 803 (70% in butoxyl) | 50 | |
| butoxyl | | 15 |

TABLE 26

| Samples | Components | Comp. 1:Comp. 2 |
|---|---|---|
| Sample 40 | Stratus | |
| Sample 41 | Comp. 1E + Comp. 2M | 94.7:5.3 |
| Sample 42 | Comp. 1F + Comp. 2M | 94.7:5.3 |
| Sample 43 | Comp. 1G + Comp. 2M | 94.7:5.3 |
| Sample 44 | Comp. 1E + Comp. 2N | 94.7:5.3 |
| Sample 45 | Comp. 1F + Comp. 2N | 94.7:5.3 |
| Sample 46 | Comp. 1G + Comp. 2N | 94.7:5.3 |

TABLE 27

|  | Samp. 40 | Samp. 41 | Samp. 42 | Samp. 43 | Samp. 44 | Samp. 45 | Samp. 46 |
|---|---|---|---|---|---|---|---|
| L average Initial | 84.31 | 85.90 | 85.87 | 86.20 | 85.93 | 85.88 | 84.94 |
| L average after scuff | 79.56 | 75.60 | 82.50 | 81.08 | 76.54 | 81.45 | 80.66 |
| L average after wipe | 82.73 | 79.93 | 85.08 | 84.40 | 81.14 | 84.49 | 83.68 |
| Delta L after scuff | 4.75 | 10.30 | 3.37 | 5.12 | 9.39 | 4.43 | 4.27 |
| Delta L after wipe | 1.58 | 5.97 | 0.79 | 1.80 | 4.79 | 1.39 | 1.26 |
| WB average Initial | 40.94 | 41.94 | 41.67 | 38.28 | 40.88 | 41.70 | 40.39 |
| WB average after scuff | 35.05 | 28.82 | 36.49 | 31.60 | 29.39 | 35.68 | 35.15 |
| WB average after wipe | 38.49 | 33.48 | 39.47 | 34.61 | 33.76 | 39.35 | 38.29 |
| Delta WB after scuff | 5.89 | 10.30 | 3.37 | 5.12 | 9.39 | 4.43 | 5.24 |
| Delta WB after wipe | 2.46 | 8.47 | 2.21 | 3.67 | 7.13 | 2.35 | 2.11 |

The results show that Samples 42-44 had a lower delta L after scuffing than Sample 41 indicating that the addition of the wax improved the black mark/scuff resistance. Similar results were demonstrated by Samples 45-46, in contrast to Sample 44, a formula containing no wax.

The example also demonstrated that the coating formulas according to the present invention provide scuff/black mark resistance and removal characteristics comparable to the traditional acrylic floor finish.

Example 9: Quaternary Amine Disinfectant Resistance Evaluation

The quaternary amine disinfectant resistance of embodiments of the present invention set forth in Tables 27-28 was evaluated in comparison to MarketStar, a traditional acrylic floor finish. For Samples 47-48, Component 2 was added to Component A in a beaker, mixed for about one minute, and then allowed to stand 15 minutes before use. Samples 49-54, were used as commercially provided.

For all samples, the finish was hand coated with a microfiber pad (~1.5"×1.5") on a pre-scrubbed black VCT at ambient conditions (72° F./43% RH). Application was controlled at about 2000 ft2/gal. The coating was allowed to air dry for about 30 minutes before applying the next coat. A total of 5 coats of the finishes were applied in one day. The coated tiles were allowed to cure at ambient conditions for at least five days before beginning the solution application.

The sample tiles were then cut into 2" by 10.5" coupons. On the day of the quaternary disinfectant treatment procedure, a 0.5 oz/gal A456II dilution was prepared by adding the A456II concentrate to deionized water and saturating two 2" by 2", 8 ply Kendall Curity Gauze Sponge with approximately 1000-1500 uL 0.5 oz/gal solution of the A456II.

To each quaternary disinfectant treatment Sample (47-48, 51-52), the following application procedure was used for a total of six applications with at least a 20 minute dry time between each application. Using a micropipette, 250 uL of the A456II solution was dispensed directly to the pre-saturated gauze pads. The A456II solution was applied to the sample coupon by lightly wiping the pre-saturated gauze pads over the coupon surface with 1-2 passes leaving approximately 0.20 g-0.25 g of solution on the coupon surface.

After the sixth A456-II solution treatment, the coupons were allowed to stand under ambient conditions for at least 12 hours before beginning the soil procedure #1 discussed below. The soil procedure #1 was conducted within 12-24 hours after the sixth A456II solution treatment.

The soiling procedure was carried out with two sets of treated coupons soiled and compared to an untreated MarketStar sample. Each set of the sample was soiled in one of two drums. The Wb color data was collected with the BYK Gardner SpectroGuide to measure the degree of soiling. A higher delta Wb (Wb before soiling-Wb after soiling) indicates a poorer soiling resistance. For the set 1, the Wb value was collected as an average of five measurements collected along the length of the coupon. For set 2 five individual measurements were taken and averaged manually.

For both drums, an initial (0 min) Wb color data was taken with the BYK Gardner Spectroguide for each coupon. Each coupon was taped into the drum with the coated side of the coupon facing the inside of the drum. 100 g of freshly prepared soiled nylon pellets were then added to the drum. The lid of the drum was secured and the soiled pellets were distributed throughout the drum. The drum was then placed on a set of rollers and rotated at a constant speed for a total of 60 minutes. Wb color data was collected after 15 minutes and 60 minutes of soiling. The 60 minute soiling results are listed in Table 30 below.

TABLE 28

| Component 1A | | Component 2B | | Mixing ratio | |
|---|---|---|---|---|---|
| | wt % | | wt % | | wt % |
| SF 5000 | 44.80 | EZ-M502 | 85.0 | Comp. 1A | 94.72% |
| DI H2O | 52.04 | DPMA | 15.0 | Comp. 2A | 5.28% |
| Tego Foamex 805 | 0.11 | | | | |
| SE-21/H2O (50/50) | 0.11 | | | | |
| Poly Emulsion 325G | 2.94 | | | | |
| Total | 100.00 | | | | |
| % solids | 18.50 | | | | |

TABLE 29

| Sample | drum | Floor Finish | Quaternary Disinfectant Treatment |
|---|---|---|---|
| 47 | 1 | Table 28 formula | A456II-0.5 oz/gal |
| 48 | 1 | Table 28 formula | A456II-0.5 oz/gal |
| 49 | 1 | MarketStar | None |
| 50 | 1 | MarketStar | None |
| 51 | 2 | MarketStar | A456II-0.5 oz/gal |
| 52 | 2 | MarketStar | A456II-0.5 oz/gal |
| 53 | 2 | MarketStar | None |
| 54 | 2 | MarketStar | None |

TABLE 30

| Condition | drum | Before Soil avg. Wb | After 60 minutes Soil avg. Wb | Delta Wb (before-After) |
|---|---|---|---|---|
| 47 | 1 | 62.58 | 47.46 | 15.12 |
| 48 | 1 | 62.5 | 47.34 | 15.16 |

TABLE 30-continued

| Condition | drum | Before Soil avg. Wb | After 60 minutes Soil avg. Wb | Delta Wb (before-After) |
|---|---|---|---|---|
| 49 | 1 | 64.93 | 48.33 | 16.6 |
| 50 | 1 | 64.24 | 50.01 | 14.23 |
| 51 | 2 | 65.97 | 40.09 | 25.88 |
| 52 | 2 | 65.83 | 43.22 | 22.61 |
| 53 | 2 | 64.24 | 48.24 | 16 |
| 54 | 2 | 65.89 | 50.22 | 15.67 |

The above data shows that, for drum 1, the Wb change for the quaternary amine disinfectant treated invention formula of Samples 47 and 48, was about 15 and the non-quaternary amine disinfectant treated acrylic finish (Samples 49-50) was in the range of 14.2 to 16.6, respectively. In contrast, the drum 2 data shows that the quaternary amine disinfectant treated acrylic finish of Samples 51-52 had a significant higher delta Wb after soiling (about 22.6 to 25.9) in comparison to non-quaternary amine disinfectant treated Samples 53-54, which had a Wb change of about 16.

The results indicate that embodiments of the present invention, after being treated with the quaternary amine disinfectant, exhibited a significantly higher quaternary amine disinfectant resistance than the acrylic coatings. The quaternary amine disinfectant treated embodiments of the present invention showed similar floor appearance to the acrylic finishes that were not treated with the quaternary amine disinfectant cleaner.

Example 10: Burnish Response

Samples 55-57 set forth in Table 31 below were tested to determine the effect of contacting coated vinyl composite flooring with a burnishing pad. For Sample 55, five coatings were applied to a floor sample at 2000 ft$^2$/gallon with a microfiber pad with 30-60 minute dry time in between coating applications. For Sample 56, three coats were applied to a floor sample at 2000 sqft/gallon with a microfiber pad with 30-60 minute dry time in between coating applications. For Sample 57, which is a high solids polyurethane material, one layer was applied at about 400 ft$^2$/gallon with a roller.

TABLE 31

| Sample | 55 | 56 | 57 |
|---|---|---|---|
| Finish | MarketStar | Sample 36 from Example 7 | Glosstek 100 |

Burnish response was tested by wearing the coating with 2 passes of a 3M brand surface preparation pad loaded onto a Tennant T3 brand autoscrubber. Dust was then removed from the test area and a total of six passes was then made with an electric UHS Whirlmatic Burnisher loaded with a 3300 natural blend pad. 20° gloss and 60° gloss was measured after every other pass (i.e., after two passes). The results are set forth in Tables 32 and 33 and FIG. 7.

TABLE 32

| Sample | Description | 20° Gloss | s.d | 60° Gloss | s.d | Delta 20° | 20° % Change |
|---|---|---|---|---|---|---|---|
| Sample 55 | After Wear with Maroon Pad | 1.4 | 0.1 | 8.7 | 0.7 | n/a | n/a |
| Sample 55 | After Burnish - 2 passes | 14.5 | 3.4 | 45.5 | 4.9 | 13.1 | 935.71% |
| Sample 55 | After Burnish - 4 passes | 23.1 | 6.5 | 54.6 | 6.4 | 21.7 | 1550.00% |
| Sample 55 | After Burnish - 6 passes | 31.3 | 6.2 | 63.3 | 6.2 | 29.9 | 2135.71% |
| Sample 56 | After Wear with Maroon Pad | 0.6 | 0.1 | 4.7 | 0.5 | n/a | n/a |
| Sample 56 | After Burnish - 2 passes | 6.5 | 0.8 | 23.2 | 2.8 | 5.9 | 983.33% |
| Sample 56 | After Burnish - 4 passes | 13.7 | 2.6 | 38.9 | 5.6 | 13.1 | 2183.33% |
| Sample 56 | After Burnish - 6 passes | 18 | 2.6 | 45.8 | 5.4 | 17.4 | 2900.00% |
| Sample 57 | After Wear with Maroon Pad | 2.3 | 0.6 | 8.8 | 2.7 | n/a | n/a |
| Sample 57 | After Burnish - 2 passes | 4.1 | 1.9 | 14.4 | 4.1 | 1.8 | 78.26% |
| Sample 57 | After Burnish - 4 passes | 6.2 | 3.7 | 19 | 4.3 | 3.9 | 169.57% |
| Sample 57 | After Burnish - 6 passes | 3.7 | 1.4 | 11.7 | 1.6 | 1.4 | 60.87% |

TABLE 33

| Sample | Description | % 20° Burnish Response in comparison to Sample 55 (Delta Sample/Delta Sample 55) |
|---|---|---|
| Sample 56 | After Burnish—2 passes | 45.04% |
| Sample 56 | After Burnish—4 passes | 60.37% |
| Sample 56 | After Burnish—6 passes | 58.19% |
| Sample 57 | After Burnish—2 passes | 13.74% |
| Sample 57 | After Burnish—4 passes | 17.97% |
| Sample 57 | After Burnish—6 passes | 4.68% |

Figure 7:
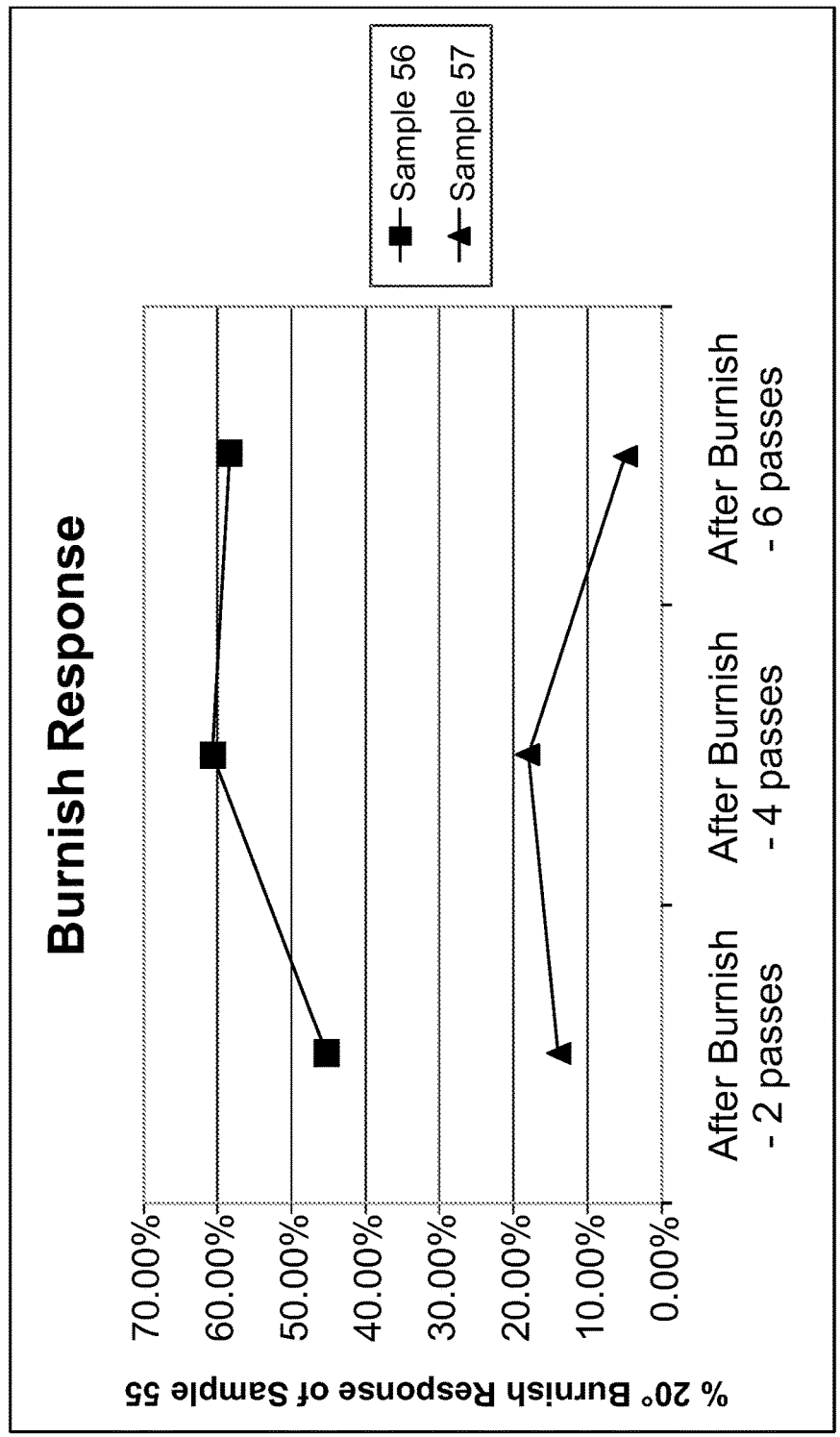
FIG. 7 is a line graph illustrating burnish properties of an embodiment of the present invention.

The results set forth in Tables 32 and 33 and in FIG. 7 demonstrate that, when compared to the acrylic coating of Sample 55, Sample 56 has a better burnishing response than Sample 57. Notably, Sample 56 had 45-60% of the burnish response of Sample 55, while Sample 57 had only about 4-18% response. The data also indicates a higher percent burnishing response (e.g., at least 80%) would be possible when compared to other zinc-based acrylic coating materials.

Example 11: Solvent for Matting Effect

Samples 56 and 58-60, set forth below, were evaluated for matting effects of different solvents. Sample 56 included DPMA (solvent), Sample 58 included propylene carbonate (solvent), and Samples 59 and 60 included DPMA and propylene carbonate.

Various samples of Component 2 were prepared as set forth in Table 34. Component 2B and Component 20 were prepared by adding the materials to a vial and mixing on a shaker for at least 30 minutes. Component 2P was prepared by mixing Component 2B with Component 20 at a 1:1 ratio. Component 2Q was prepared by mixing Component 2B with Component 20 at a 1:3 ratio.

Samples 56, 58-60 were prepared by placing Component 1 in a glass vial and then adding Component 2 to the vial according to Table 35. The vial was immediately hand shaken for a time that provided a uniform mixture. The resulting samples were applied as described in Example 1 except that 5 coatings were applied in a single day. Gloss data is presented in Table 36.

TABLE 34

| Material Description | Component 2B % by wt | Component 2O % by wt | Component 2P % by wt | Component 2Q % by wt |
|---|---|---|---|---|
| EZ-M502 | 85.00% | 85.00% | 85.00% | 85.00% |
| Propylene Carbonate | 0.00% | 15.00% | 7.50% | 3.76% |
| DPMA | 15.00% | 0.00% | 7.50% | 11.24% |

TABLE 35

| | % by wt | | | |
|---|---|---|---|---|
| Mixing Ratios | Sample 56 | Sample 58 | Sample 59 | Sample 60 |
| Component 1A | 94.71% | 94.71% | 94.71% | 94.71% |
| Component 2B | 5.29% | 0.00% | 0.00% | 0.00% |
| Component 2O | 0.00% | 5.29% | 0.00% | 0.00% |
| Component 2P | 0.00% | 0.00% | 5.29% | 0.00% |
| Component 2Q | 0.00% | 0.00% | 0.00% | 5.29% |

TABLE 36

| Sample | Coat | 20° | stdev | 60° | stdev |
|---|---|---|---|---|---|
| 56 | 1 | 3.2 | 0.6 | 21.6 | 2 |
| 58 | 1 | 1.9 | 0.4 | 16.1 | 2.8 |
| 59 | 1 | 2.9 | 0.1 | 19.3 | 0.9 |
| 60 | 1 | 4 | 0.7 | 24.6 | 2.7 |
| 56 | 2 | 11.6 | 1.7 | 47 | 1.8 |
| 58 | 2 | 8.3 | 1.5 | 40.4 | 4.2 |
| 59 | 2 | 10 | 1 | 41.8 | 1.8 |
| 60 | 2 | 11.1 | 0.8 | 45.3 | 1.7 |
| 56 | 3 | 19.2 | 1.2 | 59.2 | 1.3 |
| 58 | 3 | 12.6 | 1.6 | 48.6 | 2.5 |
| 59 | 3 | 13.7 | 0.5 | 48.6 | 0.6 |
| 60 | 3 | 15.6 | 0.9 | 52 | 1.1 |
| 56 | 4 | 31.1 | 1.2 | 70.4 | 0.9 |
| 58 | 4 | 23.2 | 1.9 | 62.7 | 1.7 |
| 59 | 4 | 21.2 | 0.9 | 59.3 | 0.8 |
| 60 | 4 | 26.5 | 1.2 | 64.7 | 0.8 |
| 56 | coat 5, gloss | 34.2 | 1.9 | 71.3 | 0.8 |
| 58 | measured 3 | 23.2 | 1.1 | 61.6 | 1.1 |
| 59 | days later | 23.3 | 1.1 | 60.6 | 0.7 |
| 60 | | 27.7 | 1 | 65 | 0.6 |

As shown in Table 36, Samples 58-60, which included propylene carbonate as a solvent provided a reduced gloss compared to Sample 56, which only included DPMA as a solvent. Samples 56 and 58-60 illustrate that solvent type and ratio of solvent can be adjusted to tailor the gloss.

Example 12: Alkali Soluble Emulsion for Matting Effect

Samples 61-64, set forth below, were evaluated for matting effects when Latekoll D (an alkali soluble emulsion) was included in the composition. Components 1H-1J were prepared as set forth in Table 37. The ingredients of a Component were added to a vial and mixed until a uniform mixture was achieved.

Samples 61-64 were prepared by mixing Component 1 in a glass vial and then adding Component 2 to the vial according to Table 38. The vial was immediately hand shaken for a time that provided a uniform mixture. The resulting samples were applied as described in Example 1 except that 5 coatings were applied in a single day. Gloss data is presented in Table 39.

TABLE 37

| Material Description | Component 1H % by wt | Component 1I % by wt | Component 1J % by wt |
|---|---|---|---|
| Component 1A | 98.0% | 99.0% | 99.5% |
| Latekoll D | 2.0% | 1.0% | 0.5% |

TABLE 38

| | % by wt | | | |
|---|---|---|---|---|
| Mixing Ratios | Sample 61 | Sample 62 | Sample 63 | Sample 64 |
| Component 1A | 94.71% | 0.00% | 0.00% | 0.00% |
| Component 1H | 0.00% | 94.71% | 0.00% | 0.00% |
| Component 1I | 0.00% | 0.00% | 94.71% | 0.00% |
| Component 1J | 0.00% | 0.00% | 0.00% | 94.71% |
| Component 2B | 5.29% | 5.29% | 5.29% | 5.29% |

TABLE 39

| Sample | Coat | 20° | stdev | 60° | stdev |
|---|---|---|---|---|---|
| 61 | 1 | 2.2 | 0.4 | 16.7 | 2.4 |
| 62 | 1 | 0.1 | 0 | 1.9 | 0.1 |
| 63 | 1 | 0.4 | 0.1 | 3.6 | 0.3 |
| 64 | 1 | 1.2 | 0.1 | 9.4 | 0.5 |
| 61 | 2 | 7 | 0.6 | 36.4 | 1.7 |
| 62 | 2 | 0.2 | 0 | 2.2 | 0.2 |
| 63 | 2 | 0.4 | 0.1 | 4.4 | 0.4 |
| 64 | 2 | 1.2 | 0.1 | 10 | 0.6 |
| 61 | 3 | 12.1 | 0.6 | 46.5 | 1.3 |
| 62 | 3 | 0.2 | 0 | 2.3 | 0.2 |
| 63 | 3 | 0.6 | 0.3 | 5.3 | 1.4 |
| 64 | 3 | 1.5 | 0.3 | 11.4 | 1.7 |
| 61 | 4 | 13.9 | 1 | 49.1 | 1.6 |
| 62 | 4 | 0.2 | 0 | 2.4 | 0.1 |
| 63 | 4 | 0.6 | 0.2 | 5.1 | 1.2 |
| 64 | 4 | 1.8 | 0.4 | 13.2 | 1.7 |
| 61 | 5 | 18.8 | 0.3 | 56.9 | 0.4 |
| 62 | 5 | 0.2 | 0 | 2.5 | 0.1 |
| 63 | 5 | 0.4 | 0.1 | 4.4 | 0.6 |
| 64 | 5 | 1.5 | 0.3 | 10.9 | 1.2 |

The addition of an alkali soluble emulsion, such as Latekoll D, can provide a reduced gloss.

Example 13: Isocyanates for Matting Effect

Samples 65-67 compared the matting effects when the composition included a polyisocyante material.

Component 2B, Component 2R, and Component 2S were prepared by adding the materials of Table 40 to a vial and mixing on a shaker for at least 30 minutes.

Samples 65-67 were prepared by mixing Component 1 and Component 2 according to Table 41 in a glass vial and mixing immediately for a time that provided a uniform mixture. The resulting samples were applied as described in Example 1 except that 3 coatings were applied in a single day. Gloss data is presented in Table 42.

TABLE 40

| Material Description | Component 2B % by wt | Component 2R % by wt | Component 2S % by wt |
|---|---|---|---|
| EZ-M502 | 85.00% | 0.00% | 0.00% |
| Tolonate HDT LV | 0.00% | 85.00% | 0.00% |
| Tolonate HDT LV2 | 0.00% | 0.00% | 85.00% |
| DPMA | 15.00% | 15.00% | 15.00% |

TABLE 41

| Component | % by wt | | |
|---|---|---|---|
| | Sample 65 | Sample 66 | Sample 67 |
| Component 1A | 94.71% | 94.71% | 94.71% |
| Component 2B | 5.29% | 0.00% | 0.00% |
| Component 2R | 0.00% | 5.29% | 0.00% |
| Component 2S | 0.00% | 0.00% | 5.29% |

TABLE 42

| Sample | Coat | 20° | St. Dev | 60° | St. Dev |
|---|---|---|---|---|---|
| 65 | 1 | 2.3 | 0.2 | 18.3 | 2.0 |
| 66 | 1 | 2.4 | 0.8 | 17.3 | 3.4 |
| 67 | 1 | 3.2 | 0.8 | 21.3 | 3.5 |
| 65 | 2 | 10.6 | 0.7 | 45.8 | 3.3 |
| 66 | 2 | 9.4 | 1.0 | 41.4 | 1.5 |
| 67 | 2 | 9.3 | 1.2 | 40.6 | 3.1 |
| 65 | 3 | 23.2 | 2.1 | 63.4 | 2.5 |
| 66 | 3 | 14.3 | 1.2 | 50.6 | 1.9 |
| 67 | 3 | 16.6 | 1.0 | 53.7 | 1.7 |
| 65 | next day | 19.4 | 1.7 | 60.3 | 2.3 |
| 66 | next day | 13.0 | 0.7 | 48.1 | 1.6 |
| 67 | next day | 14.7 | 1.8 | 49.7 | 2.6 |

As shown in Table 42, the inclusion of a polyisocyante material can provide a reduced gloss. This example demonstrates that the addition of Tolonate HDT LV and Tolonate HDT LV2 may be used in the composition to provide a reduced gloss level.

Example 14: Waxes for Matting Effect

Various waxes were added to the composition to determine their matting effect. Each sample included in addition to Poly Emulsion 325G and select samples included an additional wax or other matting agent. Sample 68 did not contain an additional wax material. Samples 69-72 included additional wax materials, Sample 73 included ES8804, and Sample 74 included an alkali soluble emulsion.

Sample 68 was prepared by mixing the materials of Table 43 in a glass jar and shaking until a uniform mixture was achieved. Samples 69-74 were prepared by taking aliquots of Sample 68 and adding the materials of Table 44. The sampled were shook to achieve a uniform mixture. The resulting samples were applied as described in Example 1 except that only a total of 3 coatings were applied in a single day. Gloss data is presented in Table 45.

TABLE 43

| Component 1A | | Component 2B | | Sample 68 | |
|---|---|---|---|---|---|
| | wt % | | wt % | | wt % |
| SF 5000 | 44.80 | EZ-M502 | 85.0 | 1A | 94.72% |
| DI H2O | 52.04 | DPMA | 15.0 | 2B | 5.28% |
| Tego Foamex 805 | 0.11 | | | | |
| SE-21/H2O (50/50) | 0.11 | | | | |
| 325G | 2.94 | | | | |
| Total | 100.00 | | | | |
| % solids | 18.50 | | | | |

TABLE 44

| Material | % by wt | | | | | |
|---|---|---|---|---|---|---|
| | Sample 69 | Sample 70 | Sample 71 | Sample 72 | Sample 73 | Sample 74 |
| Sample 68 | 97.00% | 97.00% | 97.00% | 97.00% | 99.50% | 99.50% |
| Lanco LiquiMatt 6035 | 3.00% | 0.00% | 0.00% | 0.00% | 0.00% | 0.00% |
| Lanco LiquiMatt 6375 | 0.00% | 3.00% | 0.00% | 0.00% | 0.00% | 0.00% |
| Lanco LiquiMatt 6040 | 0.00% | 0.00% | 3.00% | 0.00% | 0.00% | 0.00% |
| Lanco LiquiMatt 6024 | 0.00% | 0.00% | 0.00% | 3.00% | 0.00% | 0.00% |
| ES8804 | 0.00% | 0.00% | 0.00% | 0.00% | 0.50% | 0.00% |
| Latekoll D | 0.00% | 0.00% | 0.00% | 0.00% | 0.00% | 0.50% |

TABLE 45

| Sample | Coat | 20° | St. Dev | 60° | St. Dev |
|---|---|---|---|---|---|
| 68 | 1 | 2.3 | 0.2 | 18.3 | 2.0 |
| 69 | 1 | 1.2 | 0.1 | 10.8 | 0.8 |
| 70 | 1 | 2.1 | 0.2 | 15.2 | 0.8 |
| 71 | 1 | 1.4 | 0.2 | 12.9 | 0.9 |
| 72 | 1 | 1.9 | 0.4 | 15.7 | 1.8 |
| 73 | 1 | 1.9 | 0.3 | 15.6 | 1.4 |
| 74 | 1 | 1.1 | 0.2 | 8.8 | 0.6 |
| 68 | 2 | 10.6 | 0.7 | 45.8 | 3.3 |
| 69 | 2 | 3.6 | 0.3 | 23.1 | 0.9 |
| 70 | 2 | 5.6 | 0.2 | 28.1 | 0.7 |
| 71 | 2 | 4.2 | 0.7 | 25.8 | 2.3 |
| 72 | 2 | 7.2 | 1.3 | 35.6 | 3.7 |
| 73 | 2 | 9.2 | 1.5 | 41.7 | 3.6 |
| 74 | 2 | 1.8 | 0.3 | 12.3 | 0.8 |
| 68 | 3 | 23.2 | 2.1 | 63.4 | 2.5 |
| 69 | 3 | 6.5 | 0.7 | 31.6 | 1.6 |
| 70 | 3 | 9.6 | 0.3 | 35.8 | 0.5 |
| 71 | 3 | 7.0 | 1.0 | 33.5 | 2.2 |
| 72 | 3 | 15.8 | 2.9 | 52.3 | 3.9 |
| 73 | 3 | 20.8 | 2.0 | 60.6 | 2.9 |
| 74 | 3 | 2.4 | 0.7 | 13.7 | 1.7 |
| 68 | next day | 19.4 | 1.7 | 60.3 | 2.3 |
| 69 | next day | 6.0 | 0.3 | 30.6 | 0.9 |
| 70 | next day | 8.3 | 0.4 | 33.3 | 0.6 |
| 71 | next day | 6.3 | 0.8 | 31.9 | 1.9 |
| 72 | next day | 12.4 | 1.3 | 47.3 | 2.2 |
| 73 | next day | 18.3 | 2.5 | 57.6 | 2.4 |
| 74 | next day | 2.4 | 0.5 | 13.6 | 1.1 |

This example demonstrates that the addition of wax materials may be used in the composition to provide a reduced gloss. In this case, Samples 69-72 provided a reduced gloss in comparison to Sample 68. Sample 73, which included ES8804 did not provide as large of a reduction in gloss as Samples 69-72. Sample 74, which included Latekoll D at 0.47% by weight in the composition provided a larger reduction in gloss than Samples 69-72.

Example 15: Burnish Response

In Example 15, burnish response for Sample 71 was compared with several commercially available finishes, used without further modification. A floor containing black VCT tile was stripped and the experimental test conditions applied to the test floor. The test compositions were applied in 2×2 foot sections with a hand application using a 1 inch by 2 inch white microfiber pad at a thickness of 2000 sqft/gal application rate with a 30 minute dry time between each application with three total coats applied to each test section. 20, 60 and 85 degree gloss data was collected with a BYK Gardner Micro-Tri-Glossmeter prior to each application and after the last application had dried with an average of five measurements recorded per test section. The floor was allowed to dry overnight prior to initiating the burnish test.

The floor was burnished using a UHS Whirlmatic Burnisher loaded with a 3300 natural blend pad going a first direction on one half of the tiles and an opposite direction on the other half. This process was completed twice and is referred to herein as one cycle. A total of 5 cycles (10 passes) was completed with gloss data and visual observations collected after every cycle (2 passes). A BYK Gardner Micro-TRI-Gloss meter was used to measure the surface gloss at 20, 60 and 85 degrees, with an average of 5 readings per measurement. The results are shown below in Table 46. Tables 47-49 below shows surface gloss results after burnishing.

TABLE 49

| Burnish (cycles) | Brulin Natural Look % 20° Burnish response in comparison to Sample 71* | Carefree Matte % 20° Burnish response in comparison to Sample 71* | Spartan Matte % 20° Burnish response in comparison to Sample 71* |
|---|---|---|---|
| 1.00 | 650.00% | 627.27% | 304.55% |
| 2.00 | 434.09% | 413.64% | 259.09% |
| 3.00 | 450.00% | 438.00% | 308.00% |
| 4.00 | 401.63% | 379.03% | 282.26% |
| 5.00 | 331.03% | 326.44% | 229.89% |

*Calculated as Delta Sample/Delta Sample 71

The results set forth in Tables 47-49 demonstrate that the commercially available acrylic matte floor finish products have a higher response to burnishing in comparison to Sample 71. After 5 cycles (10 passes) the commercial products have about 2.0 to 4.0 times the % 20 degree gloss change than Sample 71 after 5 cycles (10 passes) of burnishing. It is worth noting that even though the commercial products started out with a lower 60° gloss, they produced a higher gloss than sample 71 after 5 cycles (10 passes) of burnishing.

Example 16: Burnish Response with Different Matting Agents

In Example 16, burnish responses were tested for Samples 76-80 each including a different matting agents. Samples 76-79 included a wax and Sample 80 included an alkali soluble emulsion (Latekoll D). Component 1K, 1L, 1M, 1N,

TABLE 46

| Coat Number | Sample 71 | | | Brulin Natural Look | | | Carefree Matte | | | Spartan Matte | | |
|---|---|---|---|---|---|---|---|---|---|---|---|---|
| | 20° | 60° | 85° | 20° | 60° | 85° | 20° | 60° | 85° | 20° | 60° | 85° |
| Initial Tile (0 coats) | 0.4 | 3.5 | 14.5 | 0.3 | 3.2 | 13.7 | 0.3 | 3.2 | 12.5 | 0.4 | 3.3 | 13.3 |
| 1 | 1.6 | 12.0 | 21.7 | 1.0 | 7.8 | 23.7 | 1.0 | 8.4 | 23.3 | 0.5 | 5.6 | 23.3 |
| 2 | 3.6 | 22.5 | 32.0 | 1.5 | 13.5 | 36.5 | 2.1 | 16.0 | 36.4 | 0.5 | 7.9 | 28.7 |
| 3 | 5.6 | 30.9 | 41.8 | 2.5 | 19.2 | 46.8 | 2.9 | 21.3 | 44.1 | 2.3 | 20.5 | 35.7 |

TABLE 47

| Burnish | Sample 71 | | | Brulin Natural Look | | | Carefree Matte | | | Spartan Matte | | |
|---|---|---|---|---|---|---|---|---|---|---|---|---|
| | 20° | 60° | 85° | 20° | 60° | 85° | 20° | 60° | 85° | 20° | 60° | 85° |
| 0.00 | 5.6 | 30.9 | 41.8 | 2.5 | 19.2 | 46.8 | 2.9 | 21.3 | 44.1 | 2.3 | 20.5 | 35.7 |
| 1.00 | 7.8 | 36.6 | 50.3 | 16.8 | 42.3 | 56.2 | 16.7 | 43.7 | 54.8 | 9.0 | 34.9 | 45.1 |
| 2.00 | 10.0 | 39.8 | 54.7 | 21.6 | 48.1 | 62.2 | 21.1 | 49.7 | 60.3 | 13.7 | 42.3 | 53.8 |
| 3.00 | 10.6 | 39.8 | 53.5 | 25.0 | 51.9 | 65.7 | 24.8 | 53.9 | 64.7 | 17.7 | 46.9 | 58.4 |
| 4.00 | 11.8 | 41.9 | 56.2 | 27.4 | 54.0 | 66.2 | 26.4 | 56.1 | 65.7 | 19.8 | 49.0 | 59.2 |
| 5.00 | 14.3 | 44.5 | 59.4 | 31.3 | 56.4 | 68.8 | 31.3 | 60.7 | 70.2 | 22.3 | 52.3 | 62.9 |

TABLE 48

| Burnish (passes) | Sample 71 | | Brulin Natural Look | | Carefree Matte | | Spartan Matte | |
|---|---|---|---|---|---|---|---|---|
| | Delta20° | 20° % change | Delta20° | 20° % change | Delta20° | 20° % change | Delta20° | 20° % change |
| 1.00 | 2.2 | 39.29% | 14.3 | 572.00% | 13.8 | 475.86% | 6.7 | 291.30% |
| 2.00 | 4.4 | 78.57% | 19.1 | 764.00% | 18.2 | 627.59% | 11.4 | 495.65% |
| 3.00 | 5.0 | 89.29% | 22.5 | 900.00% | 21.9 | 755.17% | 15.4 | 669.57% |
| 4.00 | 6.2 | 110.71% | 24.9 | 2240.00% | 23.5 | 810.34% | 17.5 | 760.87% |
| 5.00 | 8.7 | 155.36% | 28.8 | 2630.00% | 28.4 | 979.31% | 20.0 | 869.57% | and 10 were prepared by adding the materials of Table 50 to a vial and mixing on a shaker for at least 30 minutes. Samples 76-80 were prepared by mixing Component 1 and Component 2 according to Table 51 in a glass vial and mixing immediately for a time that provided a uniform mixture.

TABLE 50

| | Part A (grams) | | | | |
|---|---|---|---|---|---|
| Material | Component 1K % wt | Component 1L % wt | Component 1M % wt | Component 1N % wt | Component 1O % wt |
| Component 1A | 98.00% | 98.00% | 98.00% | 98.00% | 99.82% |
| Lanco LiquiMatt 6035 | 2.00% | 0.00% | 0.00% | 0.00% | 0.00% |
| Lanco LiquiMatt 6040 | 0.00% | 2.00% | 0.00% | 0.00% | 0.00% |
| Michem Guard 350 | 0.00% | 0.00% | 2.00% | 0.00% | 0.00% |
| Michem Guard 25 | 0.00% | 0.00% | 0.00% | 2.00% | 0.00% |
| Latekoll D | 0.00% | 0.00% | 0.00% | 0.00% | 0.18% |

TABLE 51

| | % by wt | | | | |
|---|---|---|---|---|---|
| Component | Sample 76 | Sample 77 | Sample 78 | Sample 79 | Sample 80 |
| Component 1K | 94.36% | 0.00% | 0.00% | 0.00% | 0.00% |
| Component 1L | 0.00% | 94.36% | 0.00% | 0.00% | 0.00% |
| Component 1M | 0.00% | 0.00% | 94.36% | 0.00% | 0.00% |
| Component 1N | 0.00% | 0.00% | 0.00% | 94.36% | 0.00% |
| Component 1O | 0.00% | 0.00% | 0.00% | 0.00% | 94.36% |
| Component 2B | 5.64% | 5.64% | 5.64% | 5.64% | 5.64% |

The test compositions were applied to stripped black VCT title and burnished as described above in Example 15. A total of 5 burnish cycles (10 passes) were completed with gloss data and visual observations collected after every cycle (every 2 passes). A BYK Gardner Micro-TRI-Gloss meter was used to measure the surface gloss at 20, 60 and 85 degrees, with an average of 5 readings per measurement. The gloss results are shown below in Table 52. The burnishing results are shown in Tables 53-54.

TABLE 52

| Coat Number | Sample 76 | | | Sample 77 | | | Sample 78 | | | Sample 79 | | | Sample 80 | | |
|---|---|---|---|---|---|---|---|---|---|---|---|---|---|---|---|
| | 20° | 60° | 85° | 20° | 60° | 85° | 20° | 60° | 85° | 20° | 60° | 85° | 20° | 60° | 85° |
| Initial Tile | 0.3 | 2.7 | 12.5 | 0.3 | 3.3 | 13.8 | 0.4 | 3.4 | 13.2 | 0.4 | 3.5 | 14.5 | 0.4 | 3.3 | 13.3 |
| 1 | 1.7 | 12.6 | 21.7 | 1.5 | 11.6 | 17.3 | 1.8 | 13.3 | 21.6 | 1.6 | 12.0 | 21.7 | 1.4 | 11.4 | 27.9 |
| 2 | 3.5 | 22.5 | 30.5 | 2.5 | 18.3 | 22.7 | 3.6 | 22.7 | 28.8 | 3.6 | 22.5 | 32.0 | 2.9 | 21.9 | 43.5 |
| 3 | 4.4 | 28.2 | 34.5 | 4.2 | 26.3 | 31.1 | 5.0 | 29.3 | 34.8 | 5.6 | 30.9 | 41.8 | 4.9 | 31.9 | 57.7 |

TABLE 53

| Burnish (cycles) | Sample 76 | | | Sample 77 | | | Sample 78 | | | Sample 79 | | | Sample 80 | | |
|---|---|---|---|---|---|---|---|---|---|---|---|---|---|---|---|
| | 20° | 60° | 85° | 20° | 60° | 85° | 20° | 60° | 85° | 20° | 60° | 85° | 20° | 60° | 85° |
| 0 | 4.4 | 28.2 | 34.5 | 4.2 | 26.3 | 31.1 | 5.0 | 29.3 | 34.8 | 5.6 | 30.9 | 41.8 | 4.9 | 31.9 | 57.7 |
| 1 | 6.9 | 32.9 | 44.4 | 5.2 | 30.1 | 42.6 | 6.8 | 33.8 | 43.4 | 7.8 | 36.6 | 50.3 | 15.6 | 46.0 | 60.1 |
| 2 | 8.4 | 36.3 | 49.7 | 6.7 | 33.4 | 45.2 | 7.2 | 34.5 | 44.9 | 10.0 | 39.8 | 54.7 | 19.9 | 50.7 | 64.3 |
| 3 | 10.2 | 39.2 | 52.9 | 8.1 | 35.9 | 48.9 | 9.6 | 38.8 | 49.5 | 10.6 | 39.8 | 53.5 | 20.2 | 51.2 | 64.0 |
| 4 | 10.3 | 38.8 | 52.1 | 8.4 | 35.8 | 48.1 | 10.4 | 39.8 | 50.9 | 11.8 | 41.9 | 56.2 | 25.7 | 55.9 | 67.6 |
| 5 | 11.9 | 41.3 | 54.9 | 8.7 | 36.8 | 50.8 | 11.4 | 40.8 | 51.9 | 14.3 | 44.5 | 59.4 | 26.3 | 56.0 | 68.3 |

TABLE 54

| Burnish (passes) | Sample 76 | | Sample 77 | | Sample 78 | | Sample 79 | | Sample 80 | |
|---|---|---|---|---|---|---|---|---|---|---|
| | Delta20° | 20° % change | Delta20° | 20° % change | Delta20° | 20° % change | Delta20° | 20° % change | Delta20° | 20° % change |
| 1.00 | 2.5 | 56.82% | 1.0 | 23.81% | 1.8 | 36% | 2.2 | 39.29% | 10.7 | 218.37% |
| 2.00 | 4 | 90.91% | 2.5 | 59.52% | 2.2 | 44% | 4.4 | 78.57% | 15.0 | 306.12% |
| 3.00 | 5.8 | 131.82% | 3.9 | 92.86% | 4.6 | 92% | 5 | 89.29% | 15.3 | 312.24% |
| 4.00 | 5.9 | 134.09% | 4.2 | 100% | 5.4 | 108% | 6.2 | 110.71% | 20.8 | 424.49% |
| 5.00 | 7.5 | 170.45% | 4.5 | 107.14% | 6.4 | 128% | 8.7 | 155.36% | 21.4 | 436.73% |

As can be seen, all of the additives resist burnishing to a similar extent, other than Latekoll D (Sample 80), which had somewhat higher gloss than the wax-based matting agents. Sample 77 provided the most resistance to burnishing.

Although the present invention has been described with reference to preferred embodiments, workers skilled in the art will recognize that changes may be made in form and detail without departing from the spirit and scope of the invention.

The invention claimed is:

1. A method of coating a floor comprising:
combining a first component and a second component to form a polyurethane coating material, the first component comprising:
an aqueous dispersion of at least one polyol or polyol derivative, wherein the aqueous dispersion has a solids content of less than 30 wt. %, and
at least one wax emulsion; and
the second component comprising:
at least one polyisocyanate or polyisocyanate derivative, and
a solvent system comprising less than 30 wt % organic solvent, wherein no more than 1 wt % of the organic solvent has a vapor pressure of greater than 0.1 mm Hg at 20° C. based on the total weight of the coating material; and
applying at least one layer of the coating material to a floor surface, wherein the coating material has a viscosity of not more than 60 cps for at least 3 hours after the first component and second component are combined.

2. The method of claim 1 wherein the coating material is applied with a string mop, flat mop or sponge applicator.

3. The method of claim 1 further comprising burnishing the coated floor.

4. The method of claim 1 wherein the solvent system comprises at least one aprotic solvent.

5. The method of claim 1 wherein the solvent system comprises at least one ether ester.

6. The method of claim 1 wherein the solvent system comprises at least one acetate solvent.

7. The method of claim 6 wherein the at least one acetate solvent comprises an aliphatic glycol alkyl ether acetate solvent.

8. The method of claim 6 wherein the at least one acetate solvent comprises dipropylene glycol methyl ether acetate solvent.

9. The method of claim 6 wherein the at least one acetate solvent comprises 3-methoxybutyl acetate solvent.

10. The method of claim 1 wherein the coating material has a viscosity of less than 60 cps for at least 6 hours after the composition is formed.

11. The method of claim 1 wherein the coating material has a viscosity of less than 25 cps for at least 6 hours after the composition is formed.

12. The method of claim 1 wherein the coating material has a viscosity of less than 10 cps for at least 6 hours after the composition is formed.

13. The method of claim 1 wherein the wax emulsion comprises a polyethylene wax, a polypropylene wax or a mixture thereof.

14. The method of claim 1 wherein the at least one polyol or polyol derivative and the at least one polyisocyanate or polyisocyanate derivative are free of N-methylpyrrolidone.

15. The method of claim 1 wherein the aqueous dispersion has a pot life of at least 5 hours.

16. The method of claim 1 wherein the aqueous dispersion has a pot life of at least 8 hours.

17. The method of claim 1, wherein the coating material further comprises a wax matting agent and the coating material has a 60 degree gloss reading of between 10 and about 60.

18. The method of claim 1, wherein the aqueous dispersion has a solids content of about 12 wt % to about 25 wt %.

19. The method of claim 3, wherein the coating material has at least a 20% burnish response.

20. The method of claim 1 wherein
the first component comprises from about 25 wt % to about 75 wt % of the at least one polyol or polyol derivative and from about 0.5 wt % to about 10 wt % of a polyethylene wax emulsion,
the second component comprises from about 5 wt % to about 50 wt % of an organic solvent and polyisocyanate or polyisocyanate derivative, and
the weight ratio of polyol or polyol derivative to polyisocyanate or polyisocyanate derivative is from about 50:50 to about 99:1.

21. The method of claim 20, wherein the polyol or polyol derivative is a polysiloxane polyol.

22. The method of claim 20, wherein the polyethylene wax emulsion comprises high-density polyethylene wax.

23. The method of claim 20, wherein the first component further comprises a wax dispersion matting agent.

24. The method of claim 20, wherein the polyisocyanate or polyisocyanate derivative comprises hexamethylene diisocyanate.

25. The method of claim 20, wherein the organic solvent is dipropylene glycol methyl ether acetate.

* * * * *